(12) United States Patent
Andersen et al.

(10) Patent No.: US 9,048,627 B2
(45) Date of Patent: Jun. 2, 2015

(54) MODE-LOCKED FIBER LASER WITH IMPROVED LIFE-TIME OF SATURABLE ABSORBER

(75) Inventors: Thomas Vestergaard Andersen, Frederiksberg C (DK); Lasse Leick, Vaerløse (DK); Jesper Laegsgaard, Virum (DK)

(73) Assignee: NKT PHOTONICS A/S, Birkerod (DK)

(*) Notice: Subject to any disclaimer, the term of this patent is extended or adjusted under 35 U.S.C. 154(b) by 665 days.

(21) Appl. No.: 12/808,327

(22) PCT Filed: Dec. 18, 2008

(86) PCT No.: PCT/DK2008/050325
§ 371 (c)(1),
(2), (4) Date: Aug. 3, 2010

(87) PCT Pub. No.: WO2009/076967
PCT Pub. Date: Jun. 25, 2009

(65) Prior Publication Data
US 2010/0296529 A1    Nov. 25, 2010

(30) Foreign Application Priority Data

Dec. 18, 2007  (DK) .................................. 2007 01814

(51) Int. Cl.
*H01S 3/30* (2006.01)
*H01S 3/11* (2006.01)
*H01S 3/067* (2006.01)
*H01S 3/08* (2006.01)

(52) U.S. Cl.
CPC .............. *H01S 3/1118* (2013.01); *H01S 3/067* (2013.01); *H01S 3/08009* (2013.01)

(58) Field of Classification Search
CPC .... H01S 3/1118; H01S 3/067; H01S 3/08009
USPC ..................... 372/6, 18, 29.021, 33, 99, 102
See application file for complete search history.

(56) References Cited

U.S. PATENT DOCUMENTS

| 6,834,064 B1 | 12/2004 | Paschotta et al. | |
| 6,885,683 B1 * | 4/2005 | Fermann et al. | ................ 372/25 |
| 7,106,764 B1 * | 9/2006 | Weingarten et al. | ............ 372/18 |
| 2005/0018714 A1 * | 1/2005 | Fermann et al. | .................. 372/6 |

FOREIGN PATENT DOCUMENTS

WO    WO 03/055014    7/2003

OTHER PUBLICATIONS

Turchinovich et al., "Monolithic all-PM femtosecond Yb-Fiber Laser Stabilized with a Narrow-Band Fiber Bragg Grating and Pulse-Compressed in a Hollow-Core Photonic Crystal," Aug. 25, 2008, Optics Express vol. 16, No. 18, 14004-14014.*

(Continued)

*Primary Examiner* — Julio J Maldonado
*Assistant Examiner* — Joshua King
(74) *Attorney, Agent, or Firm* — Buchanan Ingersoll & Rooney PC

(57) ABSTRACT

A mode locked fiber laser system is arranged to have a lasing bandwidth and having a linear cavity, the cavity including a gain medium, a saturable absorber having a saturation power, and a filter having a spectral response, wherein the mode locked fiber laser system is arranged so that substantial CW mode locked operation is obtainable with less than 3 times the saturation fluence impinging on the saturable absorber.

32 Claims, 19 Drawing Sheets

(56) References Cited

OTHER PUBLICATIONS

Laegsgaard, "Control of Fibre Laser Mode-Locking by Narrow-Band Bragg Gratings," Apr. 22, 2008, J. Phys. B: At. Mol. Opt. Phys. 41, 095401.*

Katz et al., "Passively Mode-Locked Ytterbium Fiber Laser Utilizing Chirped Fiber Bragg-Gratings for Dispersion Control," Aug. 2, 2006, Optics Communications vol. 269 issue 1, 156-165.*

Erdogan, "Fiber Grating Spectra," Aug. 8, 1997, Journal of LIghtwave Technology, vol. 15, No. 8, 1277-1294.*

Litchinister et al., "Dispersion of Cascaded Fiber Gratings in WDM Lightwave Systems," Aug. 1998, Journal of Lightwave Technology, vol. 16, No. 8, 1523-1529.*

International Search Report dated Mar. 18, 2009.

Written Opinion of the International Searching Authority dated Mar. 18, 2009.

Robert Herda et al., "Semiconductor Quantum-Dot Saturable Absorber Mode-Locked Fiber Laser", IEEE Photonics Technology Letters, vol. 18, No. 1, Jan. 1, 2006, pp. 157-159, XP-002489183.

Jia-Min Shieh et al., "Broadly Tunable Self-Starting Passively Mode-Locked TI:Sapphire Laser With Triple-Strained Quantum-Well Saturable Bragg Reflector", Optics Communications, vol. 156, No. 1-3, Nov. 1, 1998, pp. 53-57, XP-004143046.

D. Lorenser et al., "Towards Wafer-Scale Integration of High Repetition Rate Passively Mode-Locked Surface-Emitting Semiconductor Lasers", Applied Physics B, vol. B79, No. 8, Dec. 1, 2004, pp. 927-932, XP-002333006.

A. Polynkin et al., "Short-Cavity, Passively Modelocked Fibre Laser Oscillator at 1.5 µM With 550 MHz Repetition Rate and High Average Power", Electronics Letter, Feb. 2, 2006, vol. 42, No. 3, 2 pages, XP-006026046.

J. Laegsgaard, "Control of Fibre Laser Mode-Locking by Narrow-Band Bragg Gratings", Journal of Physics B: Atomic, Molecular and Optical Physics, vol. 41, No. 9, May 14, 2008, pp. 1-10, XP-002489184.

* cited by examiner

Figure 14B
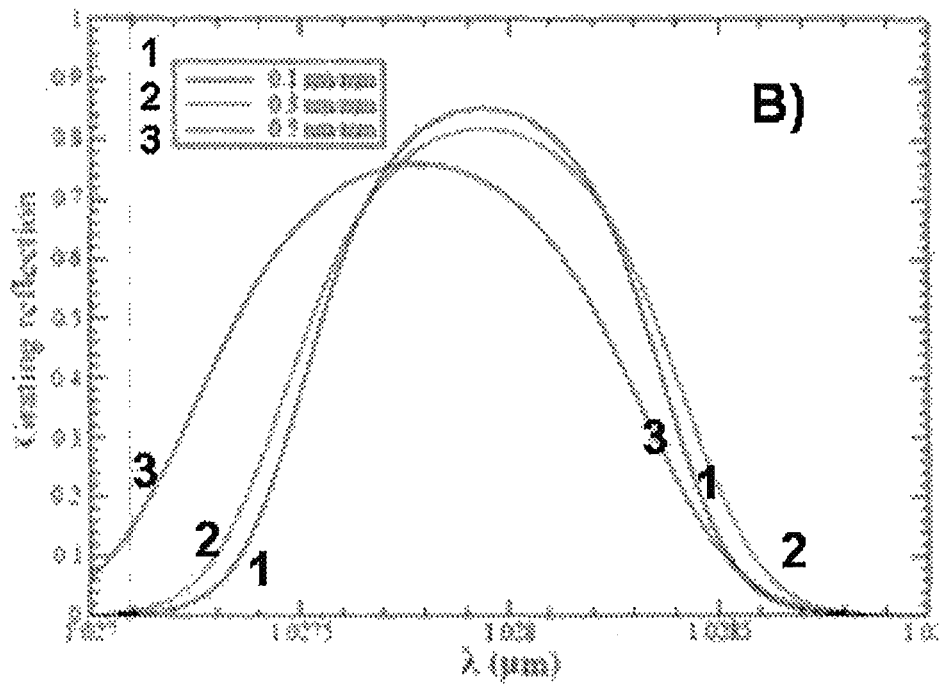
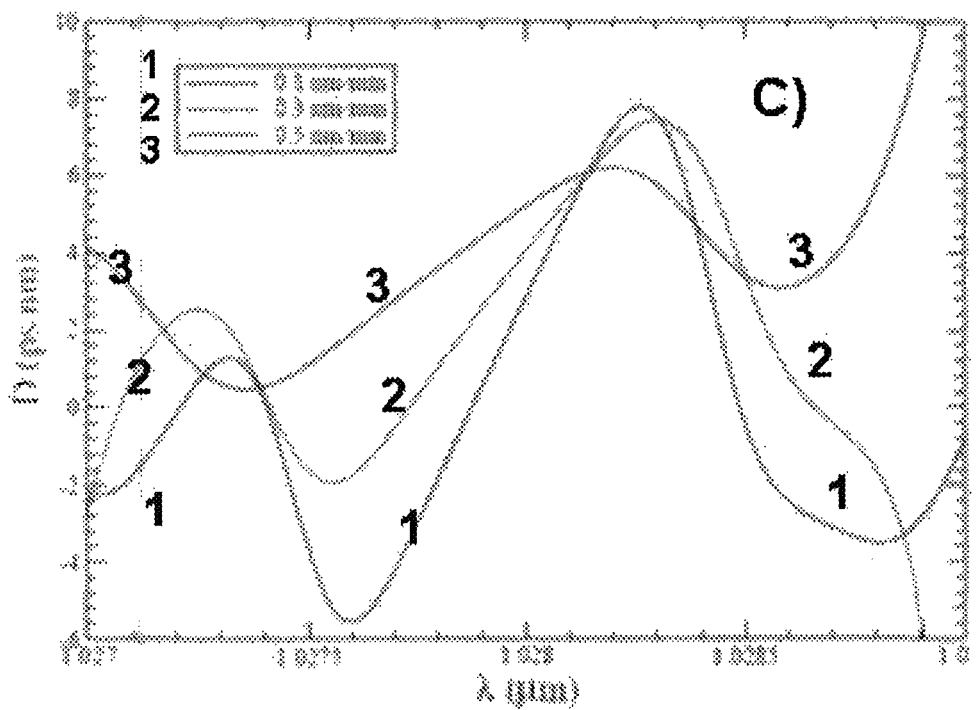
Figure 14C

MODE-LOCKED FIBER LASER WITH IMPROVED LIFE-TIME OF SATURABLE ABSORBER

The invention relates to a mode locked fiber laser system arranged to have a lasing bandwidth and having a linear cavity, said cavity comprising a gain medium, a saturable absorber having a saturation power, and filter having a spectral response.

BACKGROUND

Fiber based passively mode-locked ps lasers are of considerable interest as cheap and robust master oscillators for high-power ps and fs master-oscillator power amplifier (MOPA) systems. In particular, oscillators mode-locked by semiconductor saturable absorber mirrors (SESAMs) have been found to provide easy self-starting and good environmental stability. Considerable effort has recently been put into the development of Yb-based fiber oscillators capable of delivering high-quality self-similar pulses with a large bandwidth in both the ps and fs range.

Apart from bandwidth and pulse quality, oscillators for practical use must also satisfy strict requirements on lifetime and stability. The latter is especially important if the output pulses are to be strongly amplified. With respect to lifetime, the SESAM is a particularly critical component. To stabilize the laser the SESAM must usually be operated in a regime of strong saturation, where the increase in reflectivity with pulse energy levels out. This in turn requires a high light intensity on the device, thus reducing the lifetime. During use, the performance of most saturable absorbers degrades resulting in an increase in the required gain in the cavity which is sufficient to achieve mode-locked operation. In many configurations of mode-locked fibre lasers this increase may be compensated by increasing the pumping of the gain medium. However, at some point mode locking is no longer possible, at which point the life time of the saturable absorber may be considered to have expired. In some cases the saturable absorber becomes insensitive to the incoming optical power. The saturable absorber may also expire instantly if the impingent optical power exceeds its damage threshold. Sometimes this occurs if the laser is allowed to Q-switch with a high gain in the gain medium of the laser.

The present inventors have found that the life time of mode locked fibre lasers utilizing a saturable absorber is often limited by the life time of the saturable absorber. In many cases life times are in the order of hundreds of hours which is insufficient for most commercial applications of the laser.

SUMMARY OF THE INVENTION

Accordingly, there is a need for a mode locked fiber laser system with an extended life time of the saturable absorber. Surprisingly, the present inventors have found that suitable operation is obtainable while achieving a long life time of the saturable absorber by reducing the optical power impinging in the saturable absorber.

In one embodiment the invention relates to a mode locked fiber laser system arranged to have a lasing bandwidth and having a linear cavity, said cavity comprising a gain medium, a saturable absorber having a saturation power, and filter having a spectral response, wherein said mode locked fiber laser system is arranged so that substantial CW mode locked operation is obtainable with less than 3 times the saturation power impinging on the saturable absorber.

In one embodiment substantial CW mode locked operation is obtainable with less than 2 times the saturation power impinging on the saturable absorber, such as 1 times the saturation power impinging on the saturable absorber, such as 0.5 times the saturation power impinging on the saturable absorber, such as 0.1 times the saturation power impinging on the saturable absorber, such as 0.01 times the saturation power impinging on the saturable absorber.

In one embodiment the invention relates to a mode locked fiber laser system arranged to have a lasing bandwidth and having a linear cavity, said cavity comprising a gain medium, a saturable absorber having a saturation power, and filter having a spectral response, wherein said mode locked fiber laser system is arranged so that substantial CW mode locked operation is obtainable with less than 3 times the saturation power impinging on the saturable absorber, such as 2 times the saturation power impinging on the saturable absorber, such as 1 times the saturation power impinging on the saturable absorber, such as 0.5 times the saturation power impinging on the saturable absorber, such as 0.1 times the saturation power impinging on the saturable absorber, such as 0.01 times the saturation power impinging on the saturable absorber.

By way of the present invention the life time of the saturable absorber of a mode locked fiber laser system may be significantly extended. Accordingly, in one embodiment the invention relates to a mode locked fiber laser system with a lasing bandwidth and having a linear cavity, said cavity comprising a gain medium, a saturable absorber having a life time, and a filter having a spectral response, wherein said mode locked fiber laser system is arranged so that the life time of said saturable absorber exceeds 500 hours, such as said life time exceeds 1000 hours, such as said life time exceeds 5000 hours, such as said life time exceeds 10000 hours.

In the context of this text, the life time of the saturable absorber refers to the number of hours of operation with a particular load of pulses with a particular duration, pulse energy, peak power and repetition rate. During use the performance of most saturable absorbers degrade resulting in an increase in the required gain in the cavity which is sufficient to achieve mode-locked operation. In many configurations of mode-locked fiber lasers this increase may be compensated by increasing the pumping of the gain medium. However, at some point mode locking may no longer be possible at which point the life time of the saturable absorber may be considered to have expired. Sometimes such expiration is accompanied by a powerful Q-switch as the laser stop mode-locking. This Q-switch may burn a hole in the saturable absorber and destroy other components as well. It has been found that this often occurs after the necessary pumping power for constant output has been increased by a factor of 2. Accordingly, in one embodiment the saturable absorber is considered expired (i.e. its life time has ended) when the pump power for constant output has been increased by e.g. 50% so that such Q-switch events are avoided. In another embodiment the saturable absorber is considered expired when CW mode-locking is no longer possible. Depending on the type of saturable absorber as well as the method of coupling to light to the saturable absorber, a saturable absorber may comprise several spots where the light may be configured to interact. The life time referred to in this context refers to operation at one such spot.

A mode locked laser system according to the invention comprises a filter placed in the cavity, such as the end reflector of the cavity. The filter has spectral response arranged to penalize instability in the cavity. This effect is achieved by noticing that a pulse with an increased optical power (e.g. due to a thermal fluctuation) will experience a larger non-linearity in the cavity increasing the effect of self-phase modulation which in turn increases the spectral width of the pulse. As the pulse meets the filter, this is preferably arranged to filter away at least part of this broadening thus penalizing the fluctuation. Accordingly, in one embodiment the invention relates to a mode locked fiber laser system arranged to have a lasing bandwidth and a pulse peak power, said system having a linear cavity with a non-linear property, said cavity comprising a gain medium, a saturable absorber, and a filter having a spectral response, wherein the spectral response of said filter is arranged to reduce spectral components outside said lasing bandwidth arising from self-phase modulation caused by said non-linear property and an increase in pulse peak power.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

DETAILS OF THE INVENTION

The invention will be explained more fully below with reference to the drawings in which:

FIG. 1 shows a diagram of the laser model applied in the theoretical model discussed below. Laser amplification is modeled as a point amplification while SPM and dispersion is modeled via inserting a passive fiber with the appropriate values. The amplifier with $A_{eff}=18$ μm$^2$ is laid out between the section of 31 cm and 18 cm, respectively. All other fibers are passive PM fibers with $A_{eff}=43$ μm$^2$, FIG. 1P shows an exemplary embodiment of a mode locked laser according to the invention, FIG. 2 shows pulse (a) and chirp (b) profiles in the time domain of laser oscillators with the gratings BG3 and BG7 used as cavity end mirrors as calculated by the theoretical model.

Figure 8:
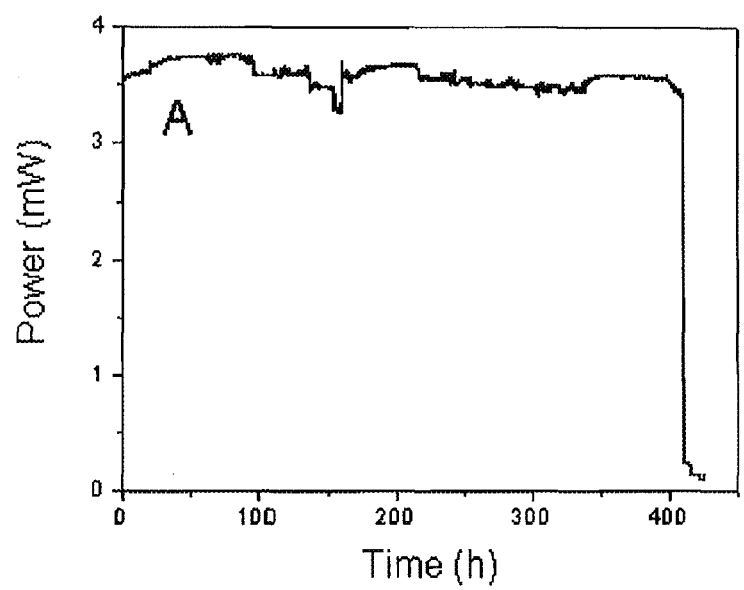
Figure 8:
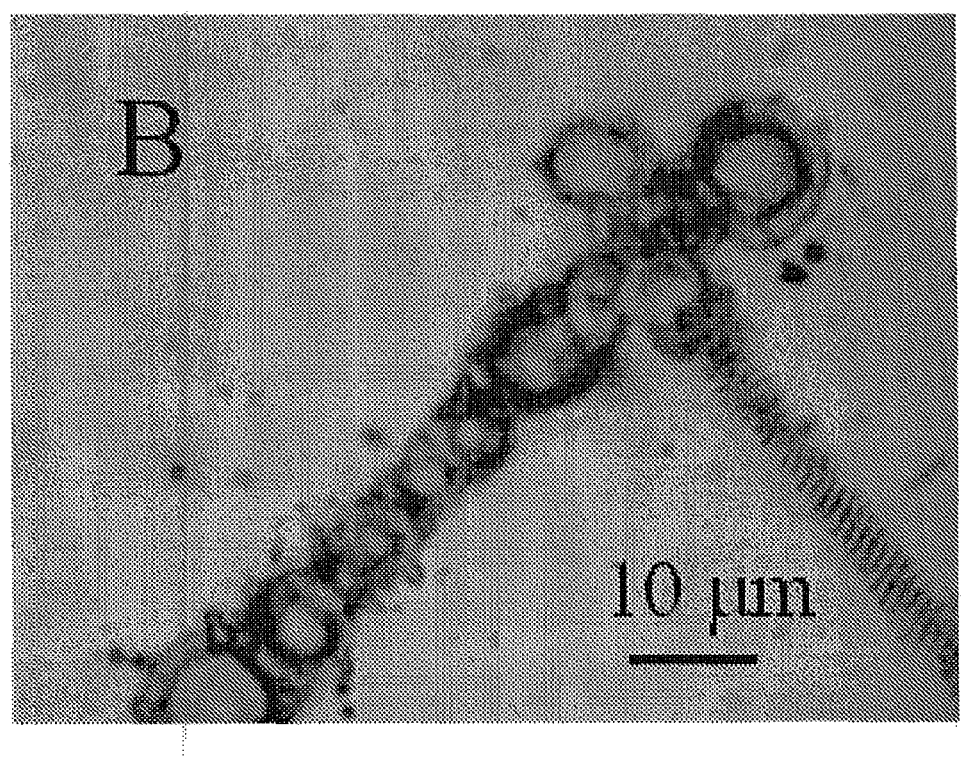

FIG. 8 shows the output power of a CW mode-locked laser as a function of time (A). After 402 hours the saturable absorber (a SESAM) dies. FIG. 8B shows a picture of a SESAM surface that has been burned by q-switches.

Figure 9:
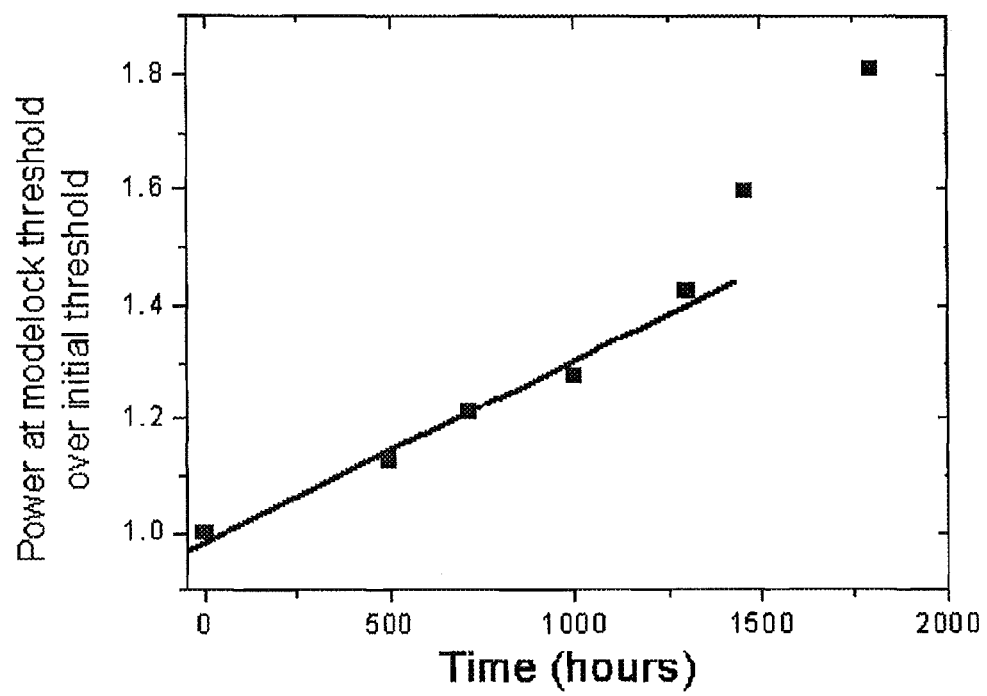

FIG. 9 shows the evolution in pump power at mode-lock threshold over time.

Figure 10:
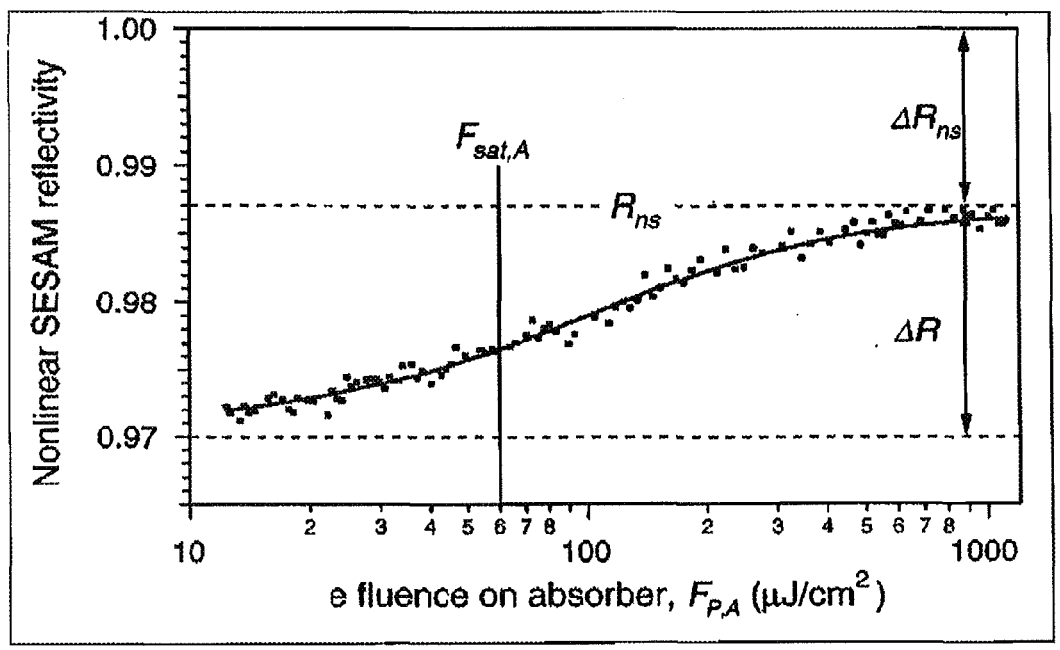

FIG. 10 shows the non-linear reflectivity of a SESAM as a function of the fluence on the absorber. $\Delta R_{ns}$ and $\Delta R$ are the non-saturable and saturable loss, $F_{sat}$, A is the saturation fluence and $R_{ns}$ is the non-saturable reflection. The non-saturable fluence is defined as the fluence where the reflection has increased by 1/e times $\Delta R$.

Figure 11:
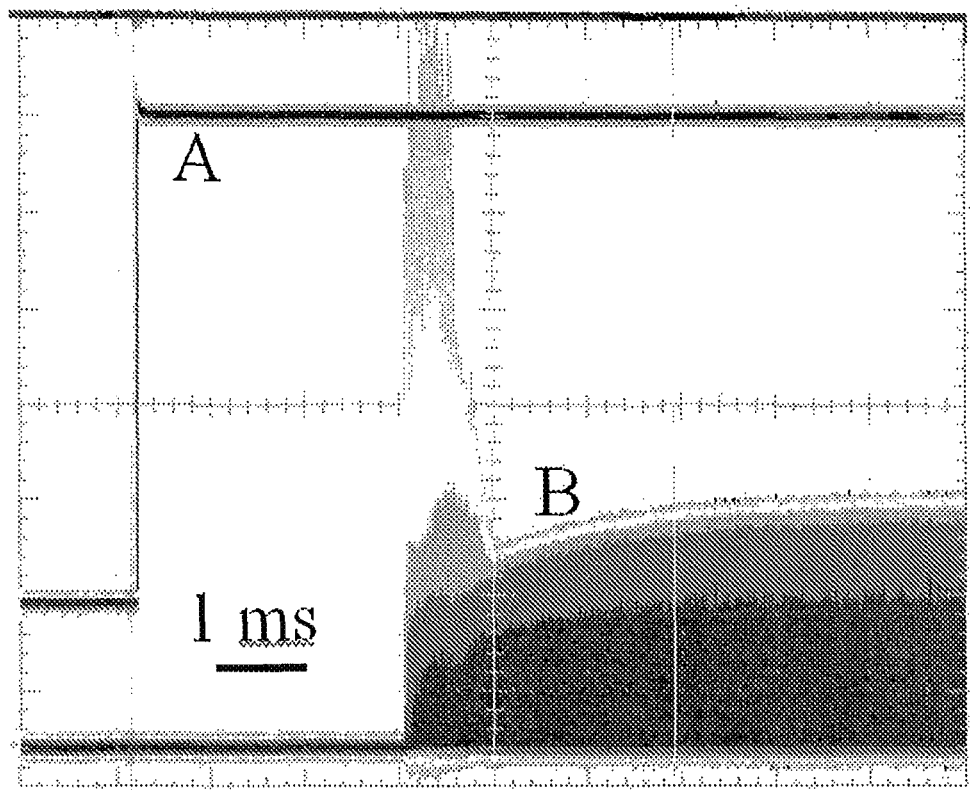

FIG. 11 shows a screen dump from a fast oscilloscope used to record 4000 start-ups of a mode-locked laser using infinite persistence. The pump power to the mode-locked laser is driven with an external function generator (A) and the resulting output power is shown in figure (B).

Figure 12:
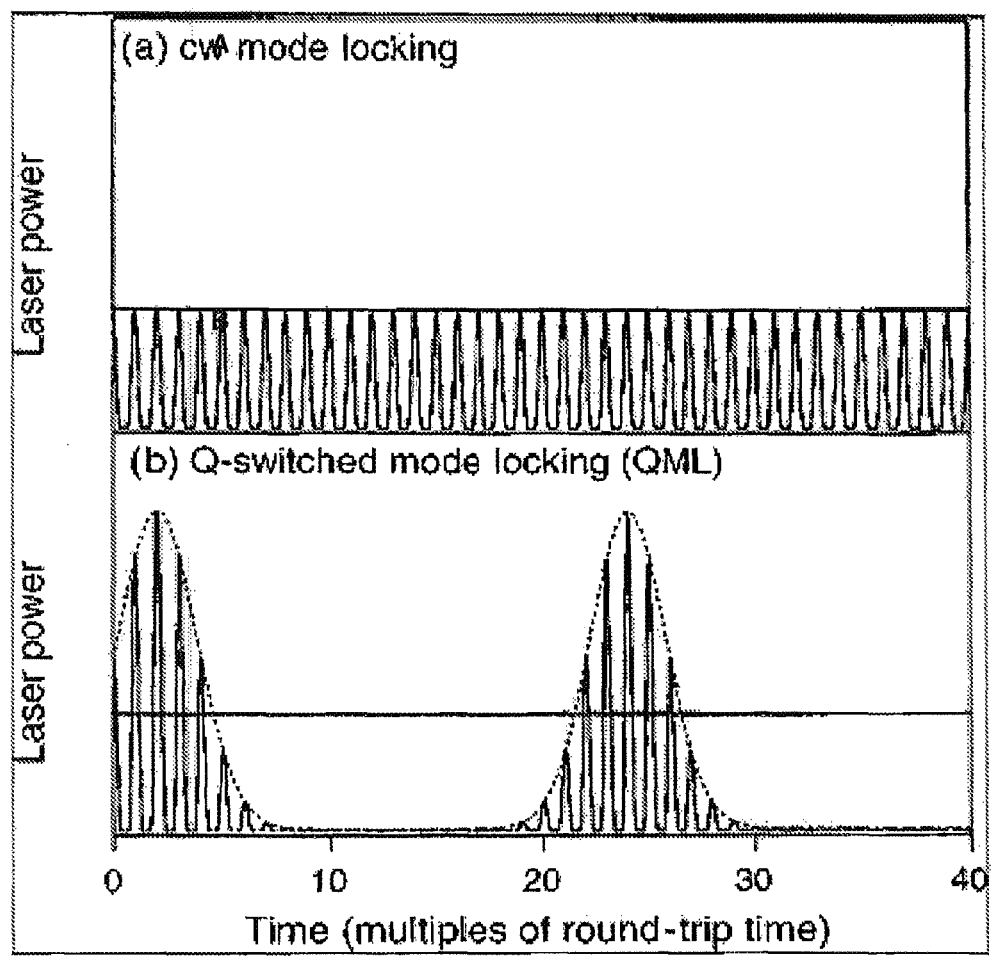

FIG. 12 shows typical output pulse trains for CW mode-locked (A) and Q-switched mode-locked (B).

Figure 13:
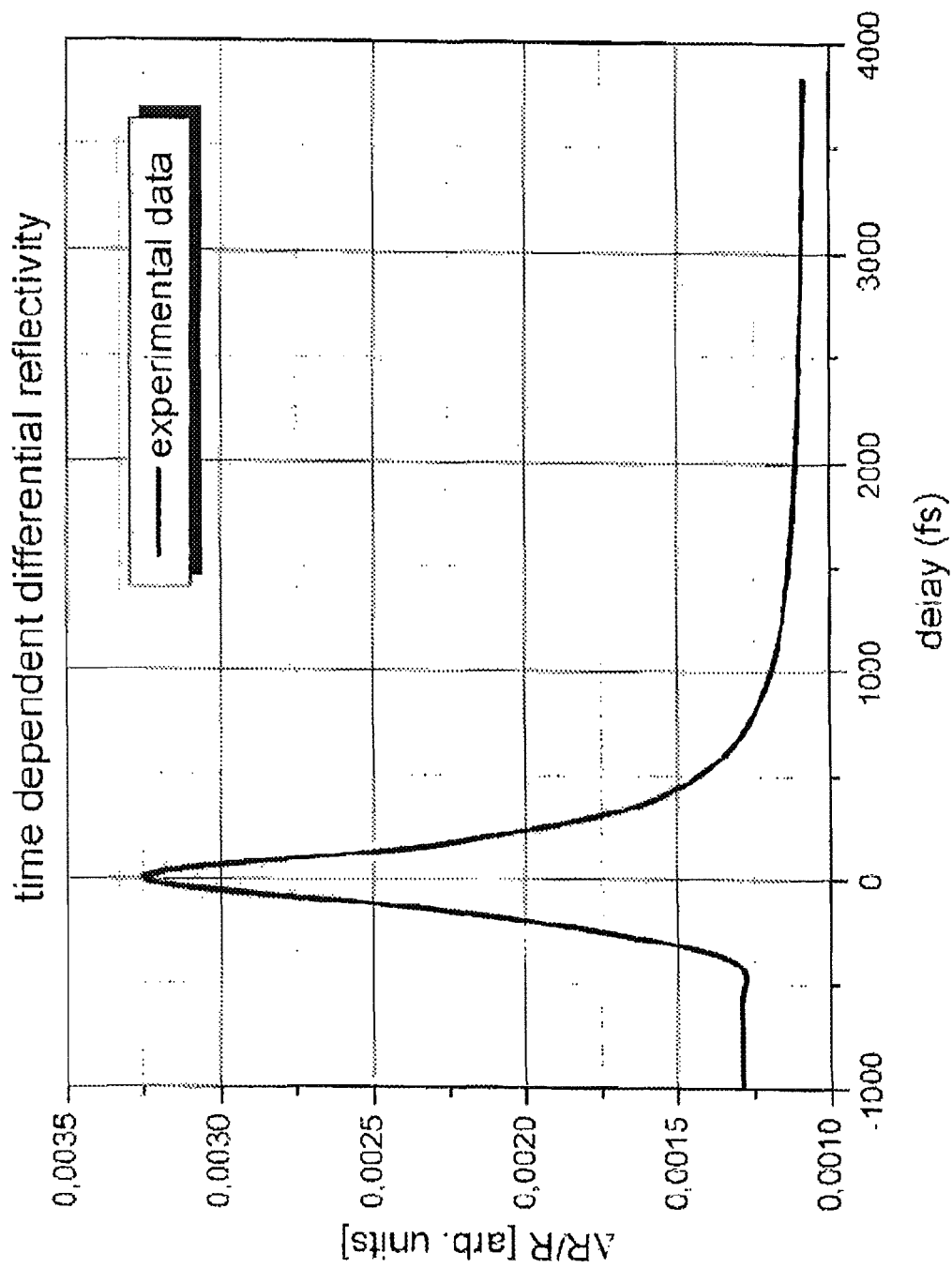

FIG. 13 shows the response of a SESAM where the two 200 fs pulses are applied to probe the reflectivity achieving high saturation for a zero delay between the pulses. With a delay of approximately 500 fs the reflectivity of the SESAM appears to be substantially independent for the two pulses.

Figure 14:
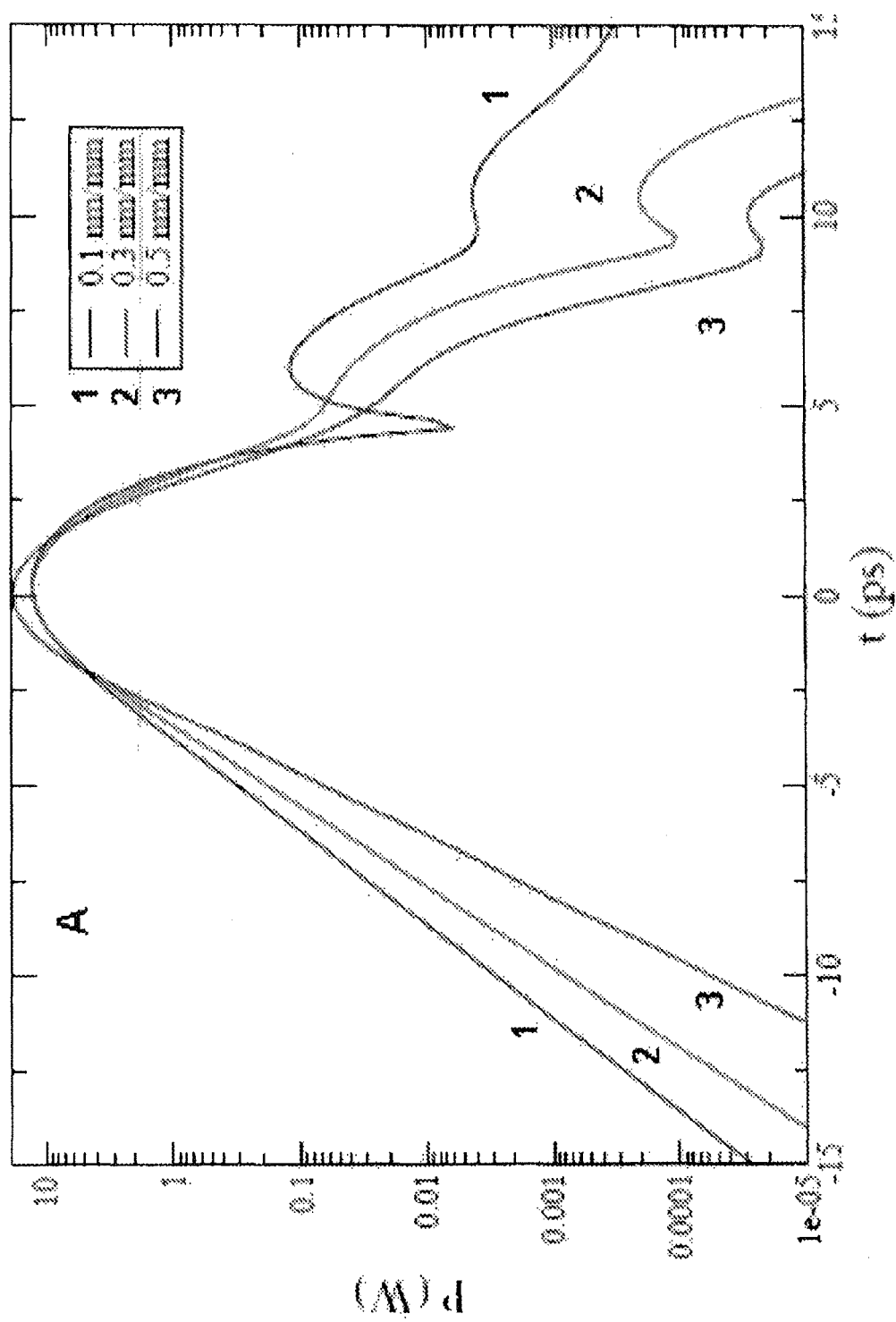

FIG. 14 shows pulse shape (A), grating reflectivity spectrum (B) and grating dispersion (C) for three Bragg gratings with a chirp of 0.1, 0.3 and 0.5 nm/mm respectively. The chirp adds positive dispersion, as a consequence the laser pulse for a grating with a 0.5 nm/mm chirp experiences anomalous dispersion over the entire pulse band width. This results in a suppression of the temporal tail of the pulse.

Throughout this text the terms "mode locked fibre laser system", "mode locked fiber laser", "laser", "fiber laser", "laser system" and "mode locked laser" are applied interchangeably.

In the following reference is made to a reflective saturable absorber where the reflectivity increases with impinging optical power; however, the presented considerations apply equally well to a transmissive saturable absorber where the transmission increases with increased optical power. In one embodiment of the invention the saturable absorber is a reflective saturable absorber, also referred to as a saturable absorber mirror, forming an end reflector of the cavity of the laser wherein the saturable material in itself is reflective and/or the saturable material is glued to a mirror. In an embodiment the saturable absorber is a transmissive saturable absorber located in the cavity of the laser. In one embodiment the saturable absorber is a semiconductor saturable absorber, such as semiconductor saturable absorber mirror (SESAM). In one embodiment of the invention the saturable absorber comprises materials selected from the group of a Cr4+:YAG saturable absorber crystal, a V3+:YAG saturable absorber crystal, GaAs, AlxGa1-xAs, InxGa1-xAs; AlGaAsSb; GaInNA, an optical fibre doped with chromium, samarium or bismuth dopants, a material comprising quantum dots such as InGaAs—GaAs multiple quantum-well absorbers.

A reflective saturable absorber increase reflectivity approaching a maximum value ($R_{ns}$) with increased optical fluence or optical power impinging on its surface. A curve for the reflectivity of a typical saturable absorber is shown in FIG. 10 where the fluence is the amount of energy experienced within the relaxation time, τ, per area by the saturable absorber. Here $\Delta R_{ns}$ and $\Delta R$ are the non-saturable and saturable loss, $F_{sat}$, A is the saturation fluence and $R_{ns}$ is non-saturable reflection. The saturation fluence is defined as the fluence where the reflection has increased by 1/e times $\Delta R$. In the event that the pulse is shorter than the relaxation time, substantially all the energy of the pulse contributes to the fluence. In the event that the relaxation time is shorter than the pulse the saturable absorber will, at least to some degree, recover during the pulse and therefore be able to respond to different parts of the pulse substantially independently. It is speculated that life time of a saturable absorber in a laser running CW mode-locking depends on the average power relative to the saturation power $P_{sat}$. The saturation power is the constant optical power per area resulting in saturation fluence, so that the fluence and saturations relate to each other as $P_{sat}$ times $\tau$. Accordingly, $P_{sat}$ may be considerably larger for a saturable absorber with a short relaxation time relative to a saturable absorber with a long relaxation time even though the saturation fluence may be identical.

In one embodiment the saturation fluence is larger than 10 $\mu J/cm^2$, such as more than or equal to 30 $\mu J/cm^2$, such as more than or equal to 50 $\mu J/cm^2$, such as more than or equal to 80 $\mu J/cm^2$, such as more than or equal to 100 $\mu J/cm^2$, such as more than or equal to 130 $\mu J/cm^2$, such as more than or equal to 160 $\mu J/cm^2$, such as more than or equal to 200 $\mu J/cm^2$, such as more than or equal to 230 $\mu J/cm^2$, such as more than or equal to 260 $\mu J/cm^2$, such as more than or equal to 300 $\mu J/cm^2$.

In one embodiment the relaxation time is longer than or equal to 50 fs, such as longer than or equal to 100 fs, such as longer than or equal to 250 fs, such as longer than or equal to 500 fs, such as longer than or equal to 750 fs, such as longer than or equal to 1 ps, such as longer than or equal to 2 ps.

In one embodiment the non-saturable absorption is less than or equal to 40%, such as less than or equal to 30%, such as less than or equal to 20%, such as less than or equal to 10%, such as less than or equal to 5%, such as less than or equal to 1%. In one embodiment the saturable absorption is more than or equal to 1%, such as more than or equal to 5%, such as more than or equal to 10%, such as more than or equal to 15%, such as more than or equal to 20%, such as more than or equal to 25%, such as more than or equal to 35%.

In overview a mode locked fiber laser system may operate in one of the follow modes:

Q-switching where energy builds in the cavity over a period of time after which it fires substantially in a single pulse. After the pulse the cavity may built up energy once more. Such pulses are often referred to as Q-switching events. These events may be destructive for one or more of the optical components of the system, such as the saturable absorber, and any objects with which the laser interacts. In the case of medical applications Q-switching events may be particularly critical as they may harm the patient.

CW mode-locked where the laser has a pulsed output with substantially identical pulses repeated with the repetition rate of the cavity of the laser. This is commonly the desired operation of the laser.

Q-switching mode locked which is a combination of the two other modes wherein the laser fluctuates emitting longer pulses modulated by a pulse train similar to that found in CW-mode locked operation. Commonly, each modulated pulse is followed by a period of very low emission while the cavity builds up energy again.

Double (triple or higher) pulsed operation may be similar to CW mode-locked but where a multiple of pulses exist simultaneously in the cavity and the repetition rate of the laser is multiplied by the number of pulses in the cavity. The different pulse may compete for energy creating instability and noise.

In one embodiment of the inventions substantial CW mode-locked operation is defined as the maximum fluctuations in pulse energy less than or equal to 20% of the average pulse amplitude, such as less than or equal to 10% of the average pulse amplitude, such as less than or equal to 5% of the average pulse amplitude, such as less than or equal to 1% of the average pulse amplitude.

In one embodiment the amplitude noise spectrum in CW mode-locked operation comprises more than or equal to 80% of the noise energy in the span from 0 to 20 kHz, such as more than or equal to 90% of the noise energy in the span from 0 to 20 kHz, such as more than or equal to 99% of the noise energy in the span from 0 to 20 kHz. In one embodiment the mode locked fiber laser system comprises an electronic trigger set to a percentage level above the average pulse amplitude. In the case that this trigger is released, Q-switching may be assumed.

Where the laser has Q-switching mode-locking it has been observed that there is often significant noise amplitude up to around 4 MHz, e.g. that up to 70% of the energy is stored here. In another embodiment the laser system mode locked fiber laser system comprises an electronic safety circuit to shut down the system if the mode-locking is too noisy. In one embodiment this is implemented by having a monitor diode coupled to a bandpass filter which allows a signal with a high frequency such as between 30 kHz and 4 MHz to get through. If the transmission through the band pass filter is too high this indicates that the mode-locking has too many fluctuations so that Q-switch mode locking is likely or a fourth coming Q-switching event is likely. In one embodiment the system is then shut down or the pump power to the gain medium is reduced.

In the following the physical mechanism behind the operation of prior art mode-locked fiber laser systems based on saturable absorbers is discussed. The function of the saturable absorber in cavity is to favor pulsing by favoring high intensity. Considering as an illustration the case where the gain of the gain medium of the cavity is increased from zero. For an active fiber functioning as a gain medium this will commonly be equivalent to increasing the power of a pump light source providing optical pumping of the active fiber. As the system has not yet begun to lase, the pumping energy will be reemitted as spontaneous emission (here neglecting any losses). At low pump power the laser system may begin to lase in CW (continuous wave) as the saturable absorber has a substantially constant reflectivity at low power. Due to thermal fluctuations this emission will vary resulting in random peaks and/or the cavity may be built up energy and release Q-switch pulses. Once the power is sufficient for the saturable absorber to vary reflectivity with the impinging fluence one of these peaks may experience a reduced loss in reflection at the saturable absorber thus favoring this peak. This may in turn start the laser emitting a pulse train with a repetition rate equal to the round trip time of the pulse, i.e. mode-locking. These pulses may experience random fluctuations due to noise or other contributions. Again, if an increase in pulse energy is favorable in the cavity, the amplitude of the pulse train may increase further until it eventually depletes the gain medium at which point the cavity may require time to build up energy once more. This corresponds to Q-switched mode-locked operation. This is illustrated in FIG. 12B. As the gain is increased further the optical fluence impinging on the saturable absorber will increase thus driving the saturable closer to the maximum reflectivity. At one point the increase in reflectivity will substantially balance the decrease in gain caused by the pulse depleting the gain medium at which point stable CW mode-locked operation is obtained. This is illustrated in FIG. 12A. This mechanism corresponds to the method applied to obtain CW mode-locked operation in the prior art. One drawback of applying this mechanism is that the saturable absorber must operate several factors above the saturable fluence in order to achieve a stable CW mode-locked operation. Commonly, a fluence of 4 to 15 times the saturation fluence is applied. Operating at such fluence appears to significantly reduce the life time of the saturable absorber. In one embodiment the fluence or operation fluence refers to the maximum fluence experience by the saturable absorber which depends on the impinging power and the relaxation time as explained above. In another embodiment fluence or operation fluence refers to the average fluence experience by the saturable absorber which depends on the impinging power and the relaxation time as explained above.

The present inventors have surprisingly found that stable CW mode-locking is achievable while operating the significantly below conventional values for fluence on the saturable absorber. This is achieved by applying a filter in the cavity of the mode locked laser system arranged to dampen a spectral broadening relative to the lasing bandwidth.

The lasing bandwidth is the bandwidth of the laser during tCW mode-locked operation. In one embodiment the lasing bandwidth refers to the 3 dB bandwidth but in some embodiments the lasing bandwidth refers to 2 times the 3 dB bandwidth. In some embodiments it refers to the 10 dB bandwidth.

Such a filter may function to penalize an increase in pulse power because such an increase will cause a spectral broadening due to increased non-linearity of the material forming the components of the cavity, such as the fiber material commonly of silica glass. In one embodiment the spectral broadening caused by an increase in optical power of a pulse is a result of non-linear effects, such as self phase modulation. In one embodiment this primarily or entirely occurs in the optical fiber comprised by the cavity. As the properties of the filter are designable (at least to some extent) the penalty of the filter may be designed to balance the reduced absorption with a lower fluence on the saturable absorber i.e. where the reflectivity of the saturable absorber would otherwise be too steep to be compensated by gain depletion in the gain medium. Thus stable CW mode-locking may be achieved for a relatively low fluence.

As the filter should penalize spectral broadening relative to the lasing bandwidth which is commonly in the order of 1 nm, the filter in one embodiment has a bandwidth of less than 3 nm, such as less than 1 nm, such as less than 0.5 nm, such as less than 0.1 nm. In one embodiment the filter has a bandwidth relative to the lasing bandwidth of less than 300%, such as less than 200%, such as less then 100%.

In order to provide a sufficient penalty to stabilize the laser the filter should exhibit a significantly increased loss outside the lasing bandwidth. Accordingly, in one embodiment the depth of the main transmission dip of the spectral response of the filter is more than or equal to 3 dB, such as more than or equal to 6 dB, such as more than or equal to 9 dB, such as more than or equal to 12 dB, such as more than or equal to 16 dB, such as more than or equal to 19 dB, such as more than or equal to 21 dB, such as more than or equal to 30 dB, such as more than or equal to 40 dB, such as more than or equal to 50 dB.

However, a strong filter may have a distorting effect on the shape of the pulses emitted from the laser system. Accordingly, in one embodiment of the invention the depth main transmission dip of the spectral response of the filter is less than 30 dB, such as less than 27 dB, such as less than 24 dB, such as less than 21 dB, such as a less than 18 dB, such as less than 15 dB, such as less than 12 dB, such as less than 9, dB, such as less than 6 dB, such as less than 3 dB.

In one embodiment the depth of the main transmission dip of the spectral response of the filter is between 3 dB to 50 dB, such as between 6 dB and 21 dB.

The term "main transmission dip" refers to the case where spectral response oscillates as a function of wavelength. The filter is preferably designed to have maximum reflectivity around the lasing bandwidth. However, other configurations may be applied as long as the filter performs the function described above. In the event that multiple peaks exist in the reflection spectrum of the filter, the main reflection refers to a peak substantially centered on the lasing bandwidth. In the event that the spectral response does not oscillate, the main transmission dip simply refers to the spectral response as a whole. A dip in the transmission spectrum commonly corresponds to a peak in reflection spectrum at least ind the case where loss is negligible.

In many embodiments there appears to be a tradeoff between the depth of the main transmission dip and pulse quality in the output i.e. low deviation from a single peak commonly preferred to be Gaussian or sech. The latter may be caused by the filter "cutting" the spectrum of the pulse. This trade off occurs as many filter types exhibit a more flat-top spectral response when said dip is deep (reflection is high) whereas as more smooth rounded response is seen for a relatively shallow transmission dip, see e.g. FIG. 4P(A) (flat top shaped) and FIG. 6A (rounded). Accordingly, a filter with a shallow transmission dip may be favored in order to achieve good pulse quality. This consideration is exemplified in FIGS. 4P to 6 discussed below. However, with a rounded reflection peak a small broadening may have a tendency to be penalized more relative to a flat top reflection peak. The cavity may therefore have an increased tendency to run in double-pulsed mode as splitting the available energy between two pulses may be favored by the rounded filter.

Depending on the configuration, higher or lower reflectivity of the filer in the lasing bandwidth may be desirable. In one embodiment of the invention peak reflection of the spectral response of the filter is less than or equal to 99%, such as less than or equal to 80%, such as less than or equal to 70%, such as less than or equal to 60%, such as less than or equal to 50%, such as less than or equal to 40%, such as less than or equal to 30%, such as less than or equal to 20%, such as less than or equal to 10%, and in one embodiment of the invention peak reflection of the spectral response of the filter is more than or equal to 5%, such more than or equal to 10%, such more than or equal to 20%, such more than or equal to 30%, such more than or equal to 40%, such more than or equal to 50%, such more than or equal to 60%, such more than or equal to 70%, such more than or equal to 80%, such more than or equal to 90%, such more than or equal to 99%. In one embodiment the peak reflection, also referred to as the reflectivity unless otherwise clear, is between 80% and 100% such as 99%. In one embodiment the reflectivity is between 70% and 80%, such as 75. In one embodiment the reflectivity is between 10% and 25%, such as 15%.

In one embodiment the spectral response of the filter comprises a substantially flat top extending more than or equal to 30% of the lasing bandwidth, such as more than or equal to 50% of the lasing bandwidth, such as more than or equal to 75% of the lasing bandwidth, such as more than or equal to 100% of the lasing bandwidth, such as more than or equal to 150% of the lasing bandwidth, such as more than or equal to 200% of the lasing bandwidth. The term substantially flat top corresponds to the reflectivity varying less than or equal to 20%, such as less than or equal to 10%, such as less than or equal to 1%.

In one embodiment, the spectral response of the filter comprises at least one slope towards lower reflectivity of more than 70% per nm, such as more than 95% per nm, such as more than 200% per nm, such as more than 500% per nm, such as more than 1000% per nm, such as more than 2000% per nm, such as more than 5000% per nm, such as more than 10000% per nm.

In one embodiment, it may be preferable for the filter to exhibit anomalous dispersion as this will work to keep pulses short countering the dispersion of the fiber of the cavity whereby soliton like pulses may be obtained. It may be preferable to have dispersion which is as uniform as possible (normal or anomalous) so that all parts of the spectrum are either compressed or broadened. However, as short pulses are often preferable it may be preferred that the filter has a spectral response providing anomalous dispersion over the lasing bandwidth. In one embodiment of the invention spectral response of the filter exhibits anomalous dispersion in more than or equal to 30% of the lasing bandwidth, such as more than or equal to 40% of the lasing bandwidth, such as more than or equal to 50% of the lasing bandwidth, such as more than or equal to 60% of the lasing bandwidth, such as more than or equal to 70% of the lasing bandwidth, such as more than or equal to 80% of the lasing bandwidth, such as more than or equal to 90% of the lasing bandwidth, such as more than or equal to 100% of the lasing bandwidth, such as more than or equal to 110% of the lasing bandwidth, such as more than or equal to 120% of the lasing bandwidth, such as more than or equal to 130% of the lasing bandwidth, such as more than or equal to 150% of the lasing bandwidth.

In one embodiment the filter comprises a grating where said grating may be a bulk grating and/or a fiber grating (a grating comprised in an optical fiber). Gratings are preferable as they provide substantial flexibility with regard to the spectral response as well as the length of the grading may determine how much an impinging pulse may be stretched upon reflection. However, it may be preferable to apply a thin film filter as the first and/or second reflector. Similarly to gratings, thin film filters (or dichroic filters) are reflecting light in one band and transmitting other light. Generally, thin film filters are more confined spatially relative to a grating which may result in less broadening of a reflected pulse; however, thin filters are typically also more broadband which may or may not be suitable for stabilizing the laser.

In a preferred embodiment the filter is a fiber Bragg grating. In designing a suitable filter it is known in the art that the strength of the Bragg grating, i.e. the index modulation, may be set to obtain the desired bandwidth of the grating and the length of the grating may be used to set the peak reflectivity. In one embodiment of the invention, the filter is a Bragg grating shorter than or equal to 10 mm, such as shorter than or equal to 5, such as shorter than or equal to 2, such as shorter than or equal to 1, such as shorter than or equal to 0.75, such as shorter than or equal to 0.5, such as shorter than or equal to 0.25. In one embodiment the index modulation of said Bragg grating is less than or equal to 3/1000, such as less than or equal to 1.5/1000, such as less than or equal to 1/1000, such as less than or equal to 0.5/1000, such as less than or equal to 0.1/1000.

In one embodiment, the Bragg grating is substantially uniform which provides simplified production. Furthermore, a uniform grating may provide a relatively deep transmission dip while maintaining a short length. The latter is preferable as a long grating may have a tendency to broaden a pulse temporally as the reflection occurs over a longer length. Substantially uniform in this context refers to the grating period and/or the index modulation varying less than 50%, such as less then 25%, such as less than 10%, such as less than 1%.

In one embodiment the Bragg grating is chirped providing the option of designing the dispersion of the spectral response thus for some embodiment providing the option of having anomalous dispersion over the lasing bandwidth which was discussed above (see FIG. 14).

In one embodiment of the invention the Bragg grating is apodized which may provide the advantage of suppressing side lopes of the reflection spectrum which in turn may provide improved pulse quality in the event that the pulse may otherwise interact with the side lopes.

To achieve a high spectral quality and/or pulse quality it may, in some embodiments, be advantageous to filter the output of a mode locked laser system according to the invention. Therefore, in one embodiment the laser comprises an output path, said output path comprising an optical output filter. In one embodiment the optical output filter is a tunable filter allowing for accurately removing undesired spectral components. In one embodiment the optical output filter is a Bragg grating, such as a fiber Bragg grating. In one embodiment the fiber Bragg grating is tuned by stretching the fiber comprising the grating.

In one embodiment the output pulses of the laser system according to the invention is characterized by having an output pulse shape having a main peak and an output spectral distribution. The optical output filter is then preferably arranged to reduce distortion of the output spectral distribution relative to an ideal output spectral distribution. In one embodiment said ideal output spectral distribution corresponds to more than or equal to 80% of the energy is in the main peak of the output pulse shape, such as more than or equal to 90% of the energy is in the main peak of the output pulse shape, more than or equal to 95% of the energy is in the main peak of the output pulse shape, more than or equal to 99% of the energy is in the main peak of the output pulse shape. In one embodiment the ideal output spectral distribution corresponds to CW mode-locked operation with an output comprising pulses with a fit to a Gaussian function of sech function is better than or equal to 80%, such as better than or equal to 90%, such as better than or equal to 95%, such as better than or equal to 99%.

In one embodiment the optical output filter is arranged to reduce spikes in the output spectral distribution, such as spikes caused by said spectral response of the filter.

In one embodiment of the invention the cavity of the mode locked laser system comprises an optical fiber with low non-linearity, such as large mode-field diameter fiber having a mode field with a radius of more than or equal to 6 μm, such as more than or equal to 10 μm, such as more than or equal to 15 μm, such as more than or equal to 20 μm. This may provide the advantage of allowing for longer cavity length, which in turn provides for a lower repetition rate, without having too much non-linearity in the cavity. Too much non-linearity in the cavity may provide poor pulse quality or prevent mode-locking.

In one embodiment, such optical fiber with low non-linearity may be a photonic crystal fiber, such as a holey fiber. This fiber may comprise one or more of the distinguishing properties selected from the group of a hollow core fiber, a solid core fiber, and a photonic bandgab fiber. Photonic crystal fibers provide advantages in the available design of properties such as dispersion and numerical aperture. Hollow core fibers may provide very low non-linearity as guiding may be substantially in air; however, such fibers may provide challenges in coupling to a solid core fiber.

In many applications, it is preferable to provide an output in a single polarization. Furthermore, constricting a laser system according to the invention to a single polarization may reduce noise contributions due to competition between different modes of polarization. In one embodiment the cavity comprises at least one polarizing components. The gain media emits light due to spontaneous and stimulated emission. Spontaneous emission is a stochastic process, which means that the output power and polarization fluctuate. By inserting a polarizing element in the cavity one polarization becomes dominant, which stabilizes the laser output power and increases the laser's tolerance towards environmental changes such as temperature and humidity.

In one embodiment the cavity of the laser system according to the invention is substantially polarization maintaining, such that at least one component of the cavity is polarization maintaining, preferably all the components of the cavity are polarization maintaining. Polarization maintaining is to be understood in a broad sense wherein a polarization maintaining component may alter the polarization intentionally, such as the Faraday rotator discussed below. Preferably the polarization is restored either by another component and/or by re-passing the component. Preferably a single polarization is maintained through the gain medium.

In one embodiment a mode locked laser system according to the invention has pulsed output wherein said pulse has a (FWHM) time span of more than or equal to 100 fs, such as more than or equal to 0.5 ps, such as more than or equal to 1 ps, such as more than or equal to 2 ps, such as more than or equal to 5 ps, such as more than or equal to 10 ps, such as more than or equal to 15, such as more than or equal to 30 ps. In one embodiment the pulses of the pulsed output is subjected to further compression e.g. into the fs regime.

In one embodiment a mode locked laser system according to the invention has pulsed output and a repetition rate, wherein said repetition rate is higher than or equal to 0.1 MHz, such as higher than or equal to 1 MHz, such as higher than or equal to 10 MHz, such as higher than or equal to 60 MHz, such as higher than or equal to 150 MHz, such as higher than or equal to 500 MHz. In one embodiment a mode locked laser system according to the invention has pulsed output and a repetition rate higher than or equal to 0.1 MHz, such as higher than or equal to 1 MHz, such as higher than or equal to 10 MHz, such as higher than or equal to 60 MHz, such as higher than or equal to 150 MHz, such as higher than or equal to 500 MHz. The repetition rate is commonly designed by choosing the length of the cavity; however, particularly for a repetition rate below 10 MHz the required length of cavity may be too extensive even if fibers with low nonlinearity are applied. Instead the repetition rate may be designed by combining a cavity with a higher repetition rate with a pulse picker.

The gain of the gain medium is commonly controlled by the amount of pump energy injected. In fiber lasers, the gain medium is often an optically pumped active fiber. However, in principle the gain medium may be any suitable type such as a semi-conductor amplifier.

The gain medium of the fiber laser may comprise an (or be comprised in) optical fiber waveguide, such as a single or multimode fiber where a doped core acts as a gain medium. This design has the advantage of a simple, rugged construction relatively easily implemented into the fiber laser, such as by fusion splicing. Furthermore the active fiber can also be a sealed hollow core micro-structured fiber filled with a particular gas type. However, the gain medium may also comprise (or be comprised in) a planar glass or semiconductor optical wave guide which has the advantage that a higher doping concentration of the active material can be achieved. The fiber laser may also be designed to use other types of gain media or a combination of gain media types.

The gain medium may preferably comprise at least one of the following active materials Yt, Eb, Tm, Pr, Ho, Sm, Nd all well known in the art for having suitable characteristics depending on the application—particularly with regard to wavelength. Furthermore, the fiber laser preferably comprises at least one pump light source adapted for activating at least part of said gain medium. The suitability of a pump light source is primarily determined by the emitted wavelength, optical power and in some case by pulse characteristics.

The fiber laser preferably comprises an out-coupling optical element, also referred to as an output coupler, for coupling light out of the cavity forming the output of the laser. In one embodiment said out-coupling optical element comprises a coupler, such as a polarizing coupler. However, the out-coupling optical element may also comprise a semi transparent reflector, preferably as one of the reflectors forming the cavity. In some embodiments two out-coupling optical elements are applied: one couples light of the cavity to be used for monitoring of the performance of the laser, the other out-coupling optical element couples light of the cavity forming the output of the fiber laser.

In one embodiment the output coupler couples more than or equal to 1% of the cavity, such as more than or equal to 1% of the cavity, such as more than or equal to 5% of the cavity, such as more than or equal to 10% of the cavity, such as more than or equal to 15% of the cavity, such as more than or equal to 20% of the cavity, such as more than or equal to 25% of the cavity, such as more than or equal to 40% of the cavity.

The laser is preferably isolated so that substantially any light is prevented from propagating towards the cavity from the output of the laser, as such light may otherwise provide undesired feedback into the laser cavity which may cause instability. In a preferred embodiment the fiber laser comprises at least one unit for preventing substantially any light propagating towards the cavity from the output of the laser, such as an isolator. However, in some applications of the laser there may be little or no risk of light propagating back into the laser and therefore said isolator may be omitted to save cost and/or complexity.

In the context of this text a linear cavity is taken to mean laser cavity defined by two reflectors. The reflectors are here considered to be in the cavity. In principle the linear cavity may be any type of oscillator for mode locked operation in which increased power causes a broadening of the pulses due to increased non-linearity.

In the context of the present text a spectral response may be any property as a function of wave length or frequency. In relation to filters the spectral is reflectivity and the transmission.

In the context of the present text a fiber laser is a laser comprising optical fiber as at guide for at least part of the light in the cavity. In one embodiment the fiber laser has a fiber optic gain medium. In one embodiment the laser is an all fiber laser.

DETAILS OF THE FIGURES

In the following discussion of variations of the configuration of the laser system the skilled person will realized that due to modular configuration of the laser discussed in this application a disclosure regarding a particular element of configuration is applicable to any of the embodiments discussed above and/or in the attached set of claims. This particularly pertains to the elements such as gain medium, cavity etc.

Figure 1:
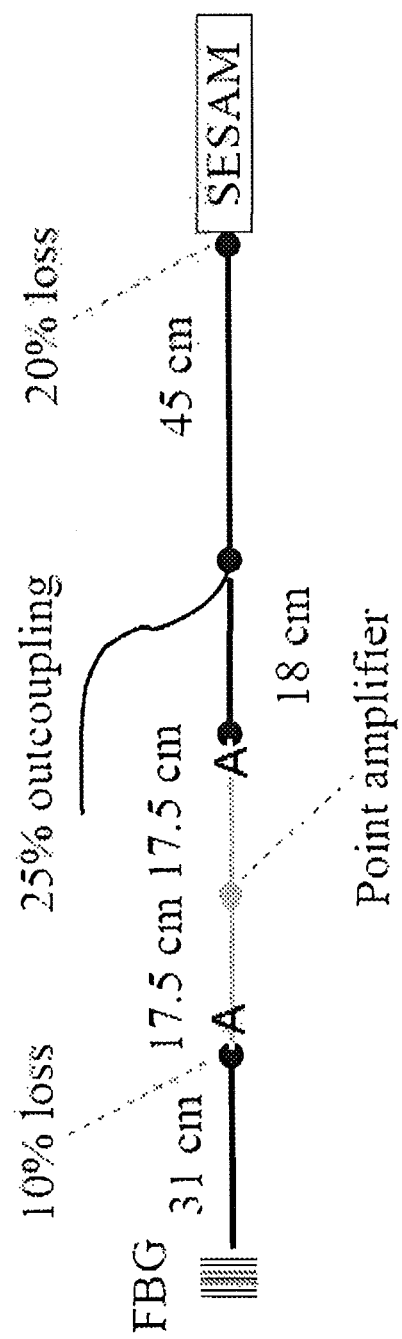
Figure 1P:
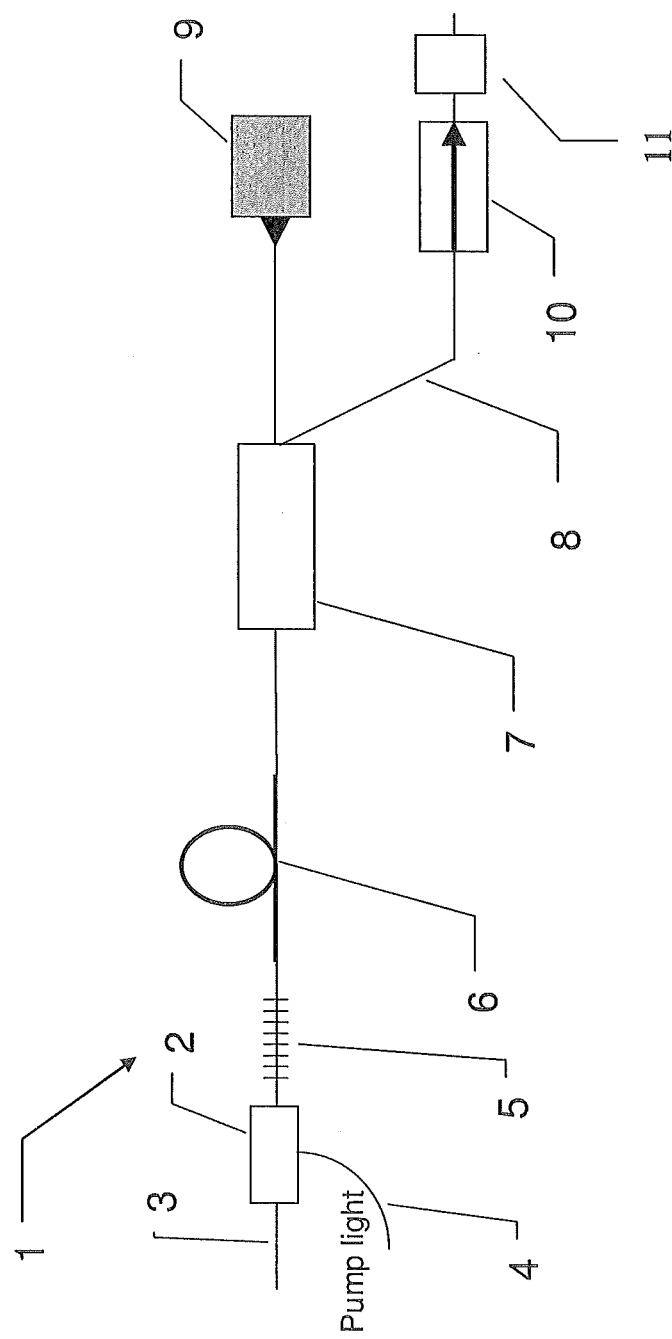

FIG. 1P shows an example of a mode locked laser system 1 according to the invention comprising a WDM 2 for introducing pump light via an input 4. The laser cavity is defined by the Bragg grating 5 and a SAM 9 acting as first and second reflectors. The gain medium, here shown as an active fiber 6, amplifies spontaneous emission from the gain medium which has been filtered by the filter, in this case a Bragg grating 5, so only desired wavelengths are reflected. The output coupler 7 couples part of the light traveling in the cavity to the output port 8 and light is prevented from entering the cavity through the output coupler 7 by the isolator 10. An optical output filter 11 is located after the isolator 10. The cavity preferably comprises polarization maintaining components and the output coupler is preferably polarizing, so that the output coupler 7 preferably has low loss in the slow axis but large loss in the fast axis. The WDM 2 further comprises a port 3 through which light passing the Bragg grating 5 may be monitored. Depending on the reflectivity of the Bragg grating 5, this port may also be utilized as an output port.

Figure 2:
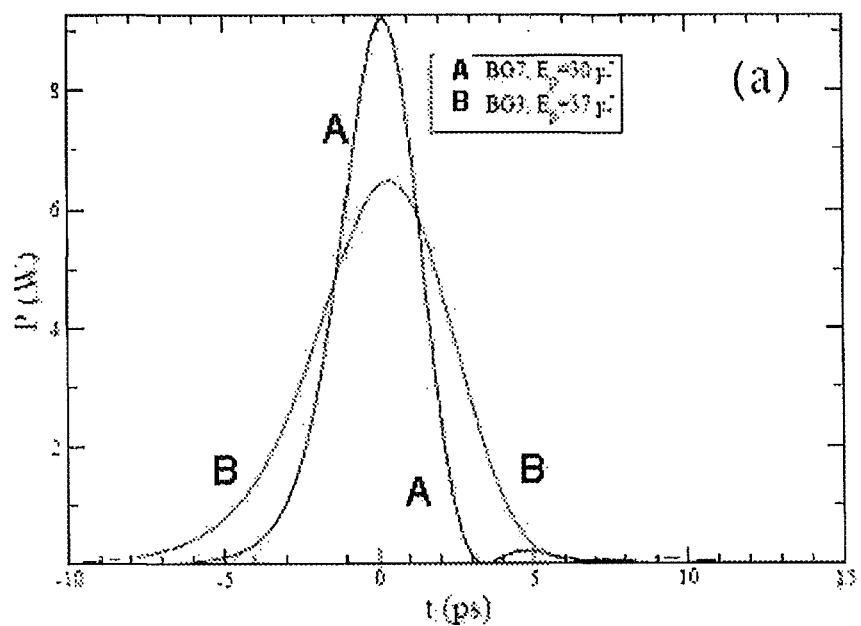
FIG. 2P shows an exemplary embodiment of a mode locked laser according to the invention.
Figure 2:
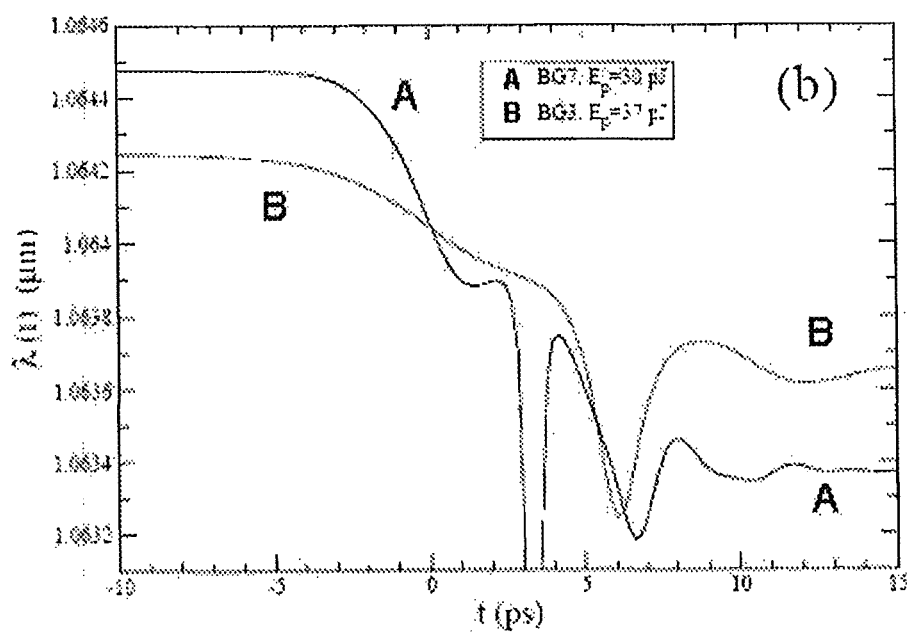
Figure 2P:
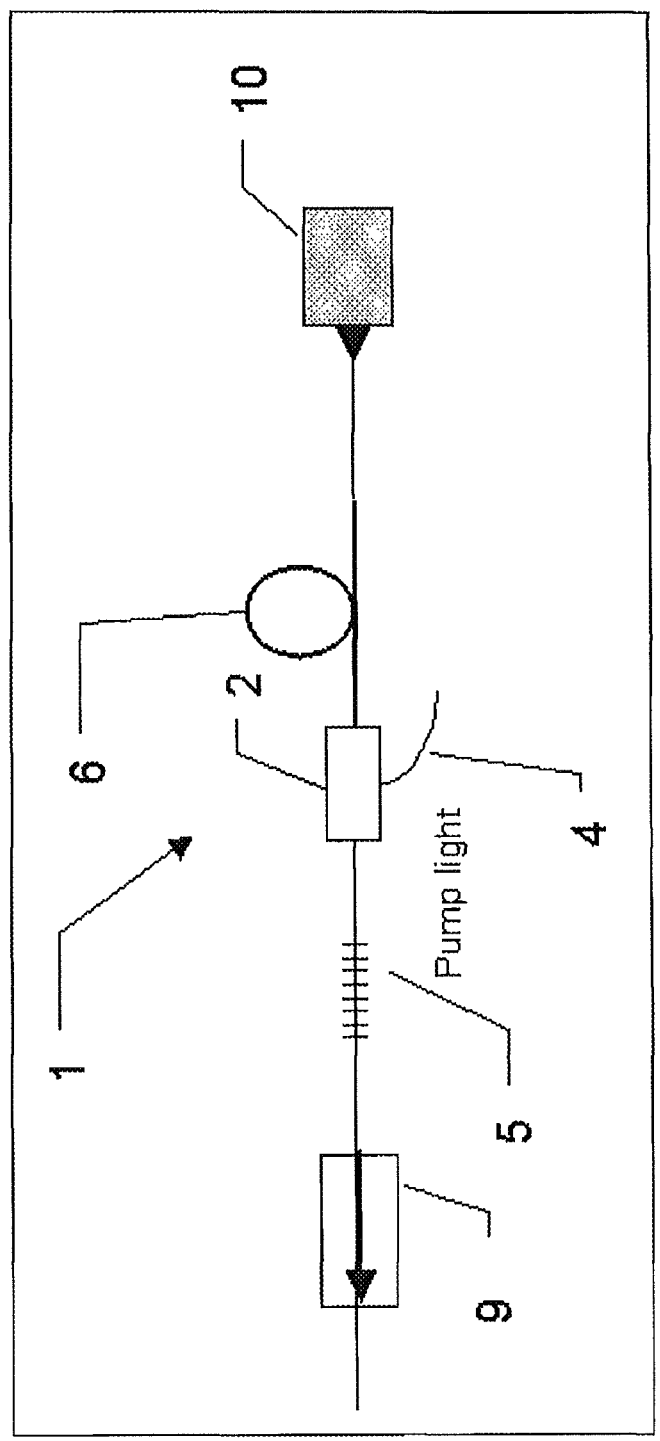

FIG. 2P shows an example of a mode locked laser system according to the invention 1 similar to FIG. 1P. Here the optical filter 5 and the WDM 2 have exchanged positions compared with FIG. 1. Hereby the filter functions both as a cavity end mirror and an output coupler, which enables a shorter laser cavity. In addition this cavity enables pumping the laser light away from the SAM 10 which may further improve its life time. Unlike the laser shown in FIG. 1P this cavity does not have additional outputs that can be used for pulse monitoring. This functionality may for example be achieved by inserting a tap coupler after the isolator.

Figure 3:
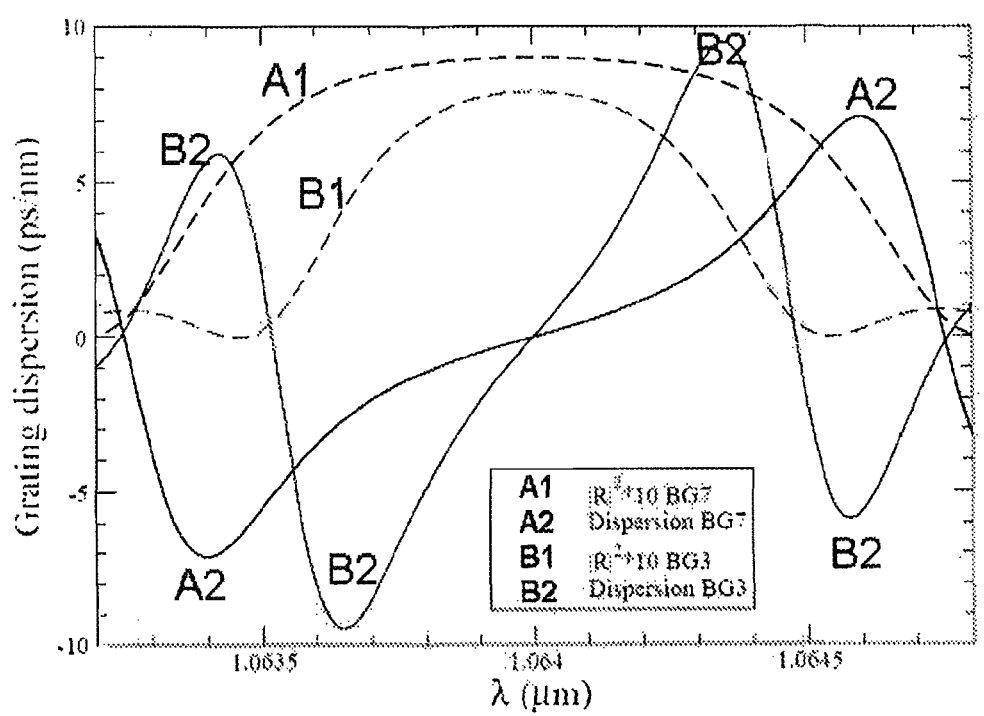
FIG. 3 shows dispersion curves (solid lines) of the BG3 and BG7 gratings. The grating reflectivity multiplied by 10 is shown by dashed lines.
Figure 3P:
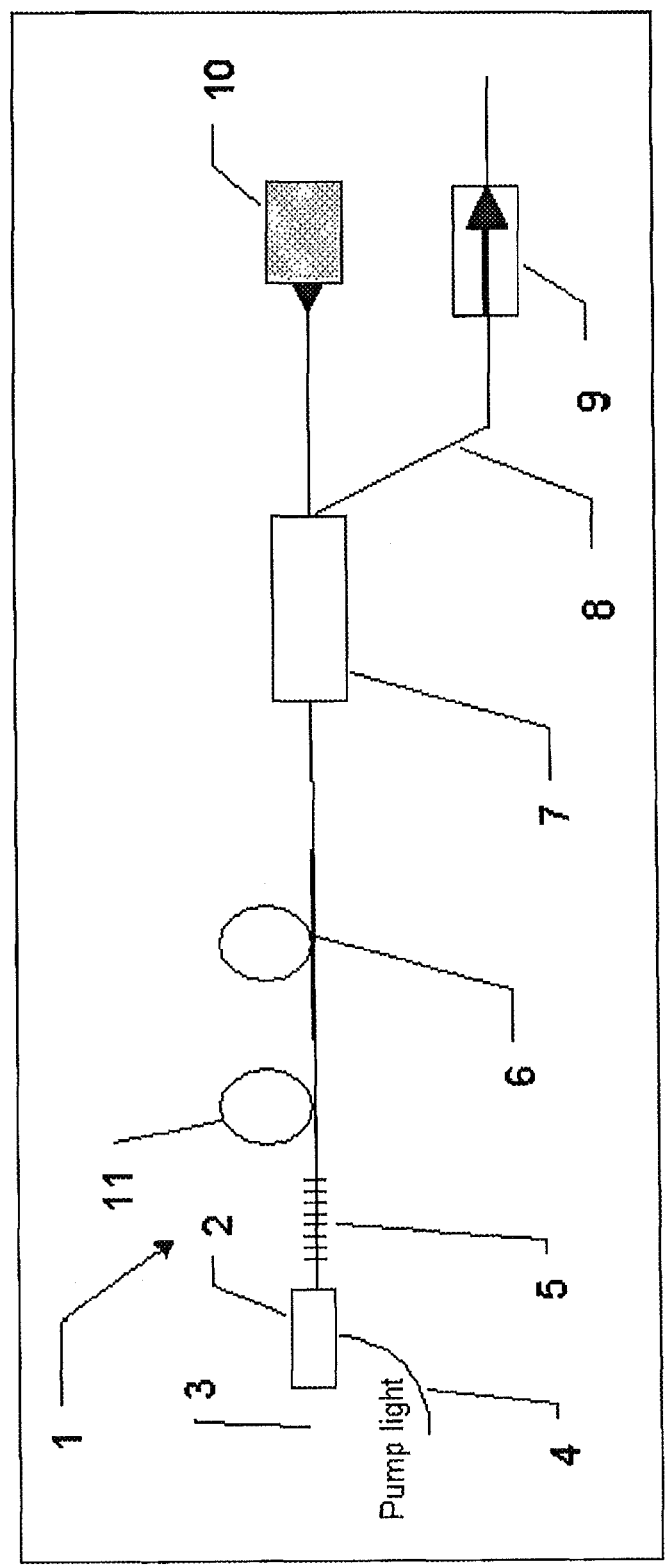
FIG. 3P shows an exemplary embodiment of a mode locked laser according to the invention.

FIG. 3P shows another example of a mode locked laser system according to the invention 1 with the addition of an extra piece of fiber between the active fiber 6 and the Bragg grating 5. Thereby it is possible to achieve a longer cavity and thereby a lower repetition rate. For this purpose it is advantageous to use a fiber with a low material non-linearity or a large mode field diameter.

Figure 4:
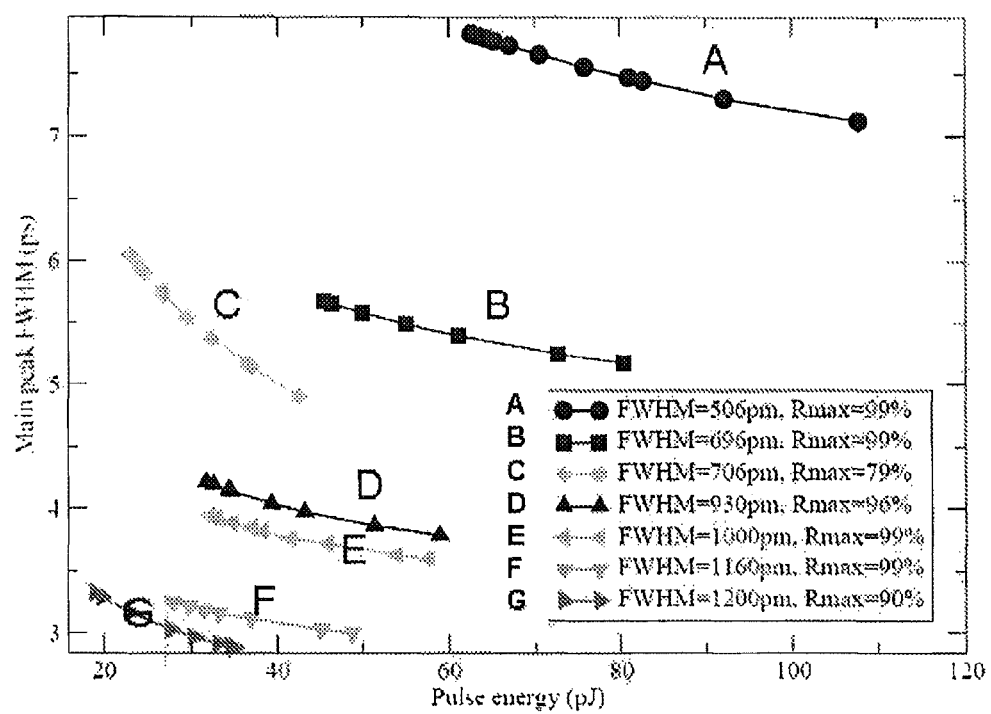
FIG. 4 shows the simulated pulse duration vs. the pulse energy for 7 different uniform Bragg gratings in a 80 MHz laser. The lowest pulse energy corresponds to the mode-lock threshold and the highest energy corresponds to the onset of double-pulse mode-locking.
Figure 4P:
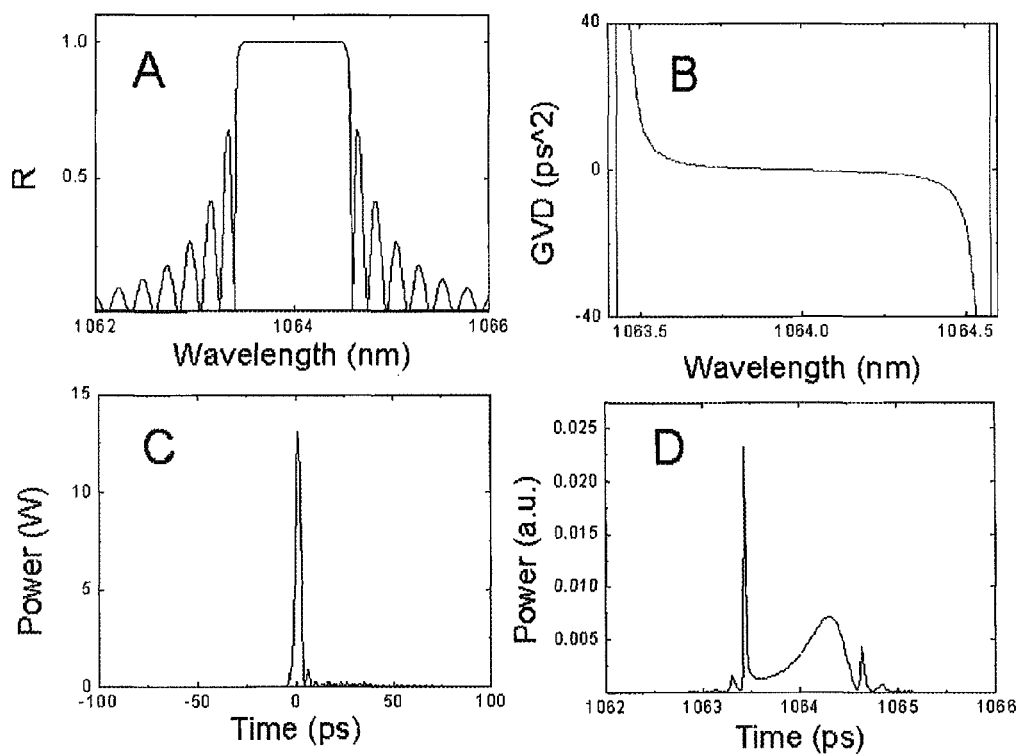
FIG. 4P shows calculated exemplary reflection spectra (A), group velocity dispersion spectra (B), pulse profile vs. time (C) and the pulse spectrum (D) for a 1.5 mm long uniform fiber Bragg grating with an index modulation of 0.0014.
Figure 5:
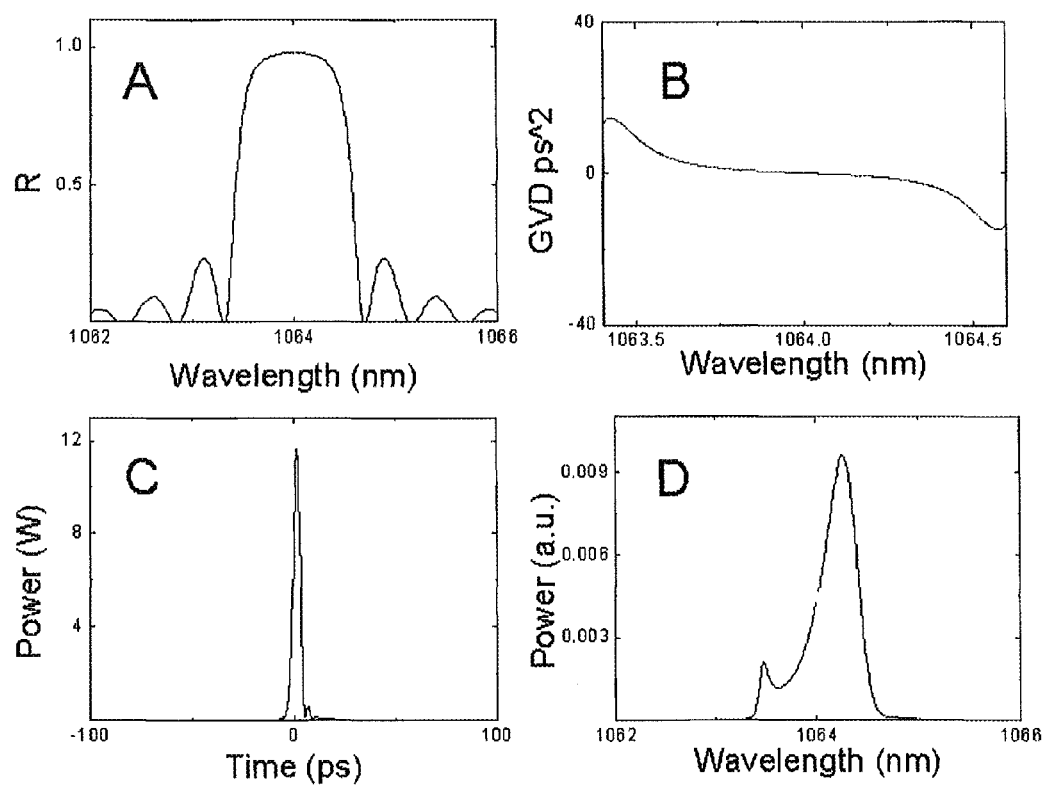
FIG. 5 shows calculated exemplary reflection spectra (A), group velocity dispersion spectra (B), pulse profile vs. time (C) and the pulse spectrum (D) for a 0.75 mm long uniform fiber Bragg grating with an index modulation of 0.0012.
Figure 6:
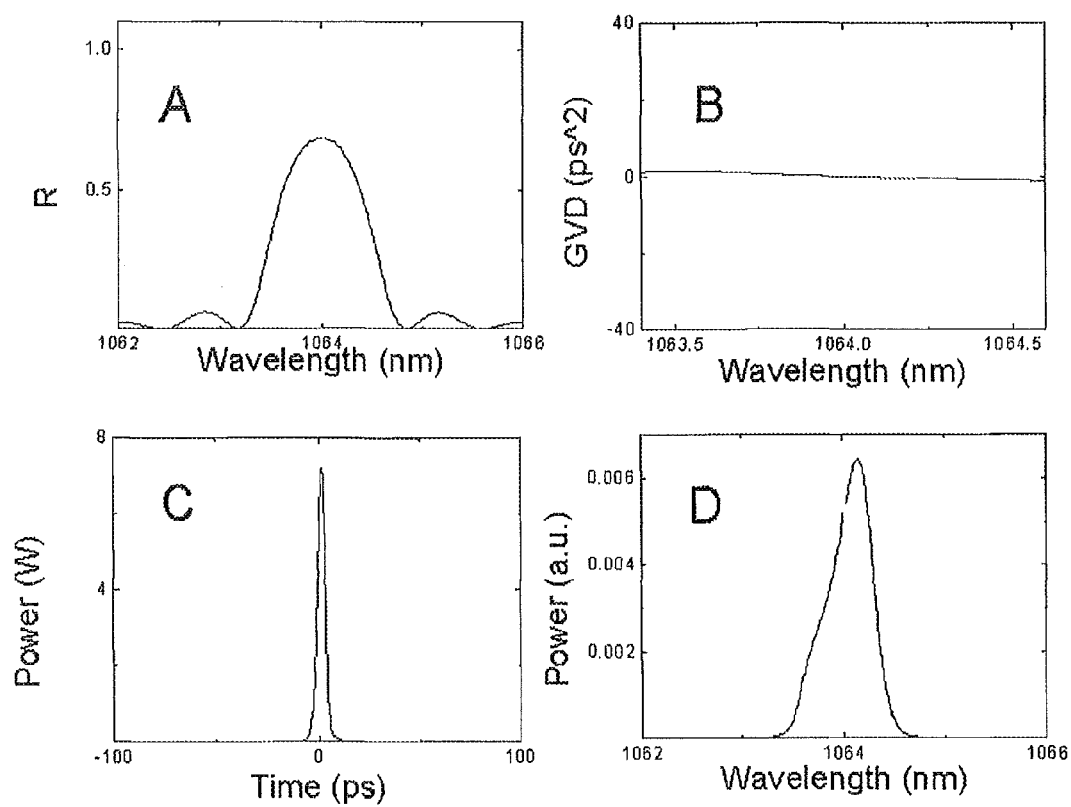
FIG. 6 shows calculated exemplary reflection spectra (A), group velocity dispersion spectra (B), pulse profile vs. time (C) and the pulse spectrum (D) for a 0.75 mm long uniform fiber Bragg grating with an index modulation of 0.00045.

Example embodiments are considered in the calculated curves of FIGS. 4P, 5 and 6. Here a mode-locked fiber laser according to the invention is considered having a repetition rate of 80 MHz. Shown as the reflection spectra (A), group velocity dispersion spectra (B), pulse profile vs. time (C) and the pulse spectrum (D). All embodiments employ a uniform fiber Bragg grating with the following parameters:

FIG. 4: 1.5 mm long with an index modulation of 0.0014 providing a transmission dip of 50 dB.
FIG. 5: 0.75 mm long with an index modulation of 0.0012 providing a transmission dip of 16 dB.
FIG. 6: 0.75 mm long with an index modulation of 0.00045 providing a transmission dip of 5 dB.

From these figures it may be observed that for the large transmission dip of FIG. 4P the pulse has a significant tail extending to 50 ps after the main pulse. This tail is spectrally related to the large wavelength spike at 1063.5 nm. In one embodiment of the invention the laser system comprises a narrowband optical output filer tuned to remove this spike after which the pulse shape is significantly improved. It is also observed that the spectral and temporal shape of the pulse appears to be improved (refer to the discussion of the ideal spectral shape above) as the transmission dip is reduced in FIGS. 5 and 6. Preferably the optical output filter is placed after an isolator so that any back reflections do not re-enter back into the cavity.

FIG. 4 shows the simulated pulse duration vs. the pulse energy for 7 different uniform Bragg gratings in an 80 MHz laser. The lowest pulse energy is the mode-lock threshold and the highest energy is the onset of double-pulse mode-locking. It has been found that this energy is approximately equal to twice the pulse energy at threshold. This figure illustrates that the pulse duration often decreases with the spectral width of the Bragg grating. Ranging from 8 ps at a 506 pm grating to 3.5 ps at 1200 pm grating. The pulse duration depends less on the reflectivity, but it is observed that the pulse energy increases rapidly with the reflection. This is confirmed by experiments where it was found that weak gratings had a narrow range of pump powers where stable operation was possible, and that there was a minimum reflection below which it was not possible to achieve single-pulse mode-locking.

Figure 7:
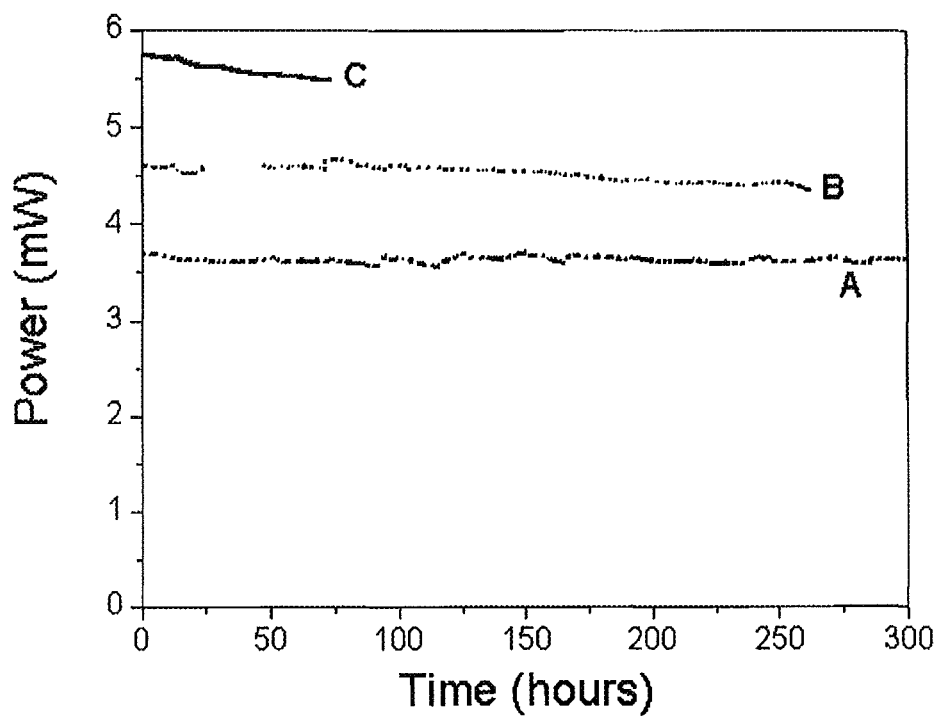
FIG. 7 shows the output power vs. time for a CW mode-locked laser at threshold (A), 13% above threshold (B) and 26% above threshold (C).

FIG. 7 shows the output power vs. time for a CW mode-locked laser at threshold (A), 13% above threshold (B) and 26% above threshold (C). The output power degrades with <1%, 3% and 6%/100 h for A, B, and C, respectively. A similar experiment shows comparable degradation rates for pulses with 5 and 10 ps when driven with the same pump power. This indicates that in CW mode-locking the degradation depends on average power and not peak power.

FIG. 8A shows the output power of a CW mode-locked laser as a function of time. After 400 hours the SESAM dies. FIG. 8B shows a picture of a SESAM surface that has been burned by q-switches. Each spot corresponds to one point on the SESAM.

FIG. 9 shows the evolution in pump power at mode-lock threshold over time. The pump power at threshold is normalized to the initial threshold. Also shown is a linear fit to the pump power threshold. The fit is only based on the first five measurements points. It shows that to a good approximation the degradation is linear with time for the first 1300 hours. Subsequently the rate of decay increases. The SESAM died after 2000 hours of operation.

FIG. 11 shows a screen dump from a fast oscilloscope used to record 4000 start-ups of a mode-locked laser using infinite persistence. The mode-locked laser is driven with an external function generator.

When the function generator turns on there is a delay of ~3 ms until the laser diode driver responds. Hereafter there are ~0.2 ms until the ML lasers starts and ~1 ms until q-switching has ceased and the laser is in a stable ML regime.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. Further examples of embodiments of the invention are discussed in the following by way of theoretical considerations.

TABLE 1

Data for the fiber Bragg gratings inserted as cavity end mirrors in the numerical simulations.

Tables

| FWHM (pm) | $R_{max}$ (%) | $\Delta n$ | Length (mm) | Label |
|---|---|---|---|---|
| 506 | 99 | $1.1 \cdot 10^{-3}$ | 1.87 | BG1 |
| 696 | 99 | $1.5 \cdot 10^{-3}$ | 1.32 | BG2 |
| 706 | 79 | $1.22 \cdot 10^{-3}$ | 0.79 | BG3 |
| 930 | 96 | $1.875 \cdot 10^{-3}$ | 0.83 | BG4 |
| 1000 | 99 | $2.168 \cdot 10^{-3}$ | 0.83 | BG5 |
| 1160 | 99 | $2.61 \cdot 10^{-3}$ | 0.78 | BG6 |
| 1200 | 90 | $2.26 \cdot 10^{-3}$ | 0.55 | BG7 |

To elucidate the experimental findings the evolution of a mode-locked pulse circulating in the cavity was investigated numerically. The model laser design is shown in FIG. 1. The reflection of the pulse in the FBG at the left end of the cavity is described by multiplying the pulse envelope, G(ω,z) in the frequency domain by the complex reflection coefficient R(ω) of the grating. The transmitted pulse is similarly found by multiplying G with the complex transmission coefficient T. In this way, both the frequency-dependent reflection strength and the grating dispersion is taken fully into account. In fact, as we shall see, the grating dispersion is decisive in determining the shape of the mode-locked pulse.

The action of the SESAM at the right end of the cavity is described in the time domain, according to the equations:

$$G(t, z) \to G(t, z)\sqrt{1 - A_0 - N_1^S(t)\sigma_S} \quad (1)$$

$$\frac{dN_1^S}{dt} = -\frac{dN_2^S}{dt} = \frac{N_2^S}{\tau_S} - \frac{N_1^S |G(t,z)|^2}{A_{eff}^S F_S} \quad (2)$$

Here $N_1^S$, $N_2^S$ is the concentration (per area) of SESAM absorbers in the ground and excited states respectively, $\sigma_S$ is their absorption cross section, $\tau_S$ is their relaxation time, and $A_o$ is the unsaturable absorption of the SESAM. $A_{eff}^S$ is an effective focusing area of the laser spot on the SESAM, which in all calculations presented here was set to $9\pi$ μm², corresponding to a spot diameter of 6 μm. $F_S$ denotes the saturation fluence of the SESAM. The parameters $\sigma_S$ and $N_o^S = N_1^S + N_2^S$ can be calculated from the saturation fluence and saturable absorption, $\Delta A$, of the device according to:

$$\sigma_S = \frac{\hbar\omega_0}{F_s}, N_0^S = \frac{\Delta A}{\sigma_s} \quad (3)$$

We use the parameters $\Delta A$=0.24, $F_S$=70 J/cm², $A_0$=0.16, and $\tau_S$=500 fs.

For the propagation in the fibers two modeling schemes were investigated. In the first approach, propagation is described by a generalized nonlinear Schrödinger equation (GNLSE), including third-order dispersion, as well as Raman and self-steepening effects. The Yb-doped fiber serving as a gain medium was approximated by a point amplifier (green point in FIG. 1), surrounded by passive fibers (green lines in FIG. 1) with an effective area appropriate for the actual Yb-doped fiber. The $A_{eff}$ values for both active and passive fibers were estimated from measurements of the mode profile. For both types of fiber, dispersion parameters of $\beta_2$ =0.0023 ps²/m and $\beta_3$ =3.9·10⁻⁵ ps³/m were used, in accordance with the data published by Nielsen et al for fibers similar to the passive fiber used here. Since the fibers contribute only a small fraction of time total cavity dispersion (see below) the accuracy of these dispersion parameters is not crucial to the model. On the other hand, the $A_{eff}$ values are highly significant, since SPM in the fibers play an important role in the pulse shaping.

The total gain of the active fiber is given by:

$$g(\omega) = \exp\{(\sigma_e(\omega)N_2 - \sigma_a(\omega)N_1)L\} \quad (4)$$

where $\sigma_a(\omega)$, $\sigma_e(\omega)$ are the absorption and emission cross sections of Yb, respectively, $N_1$ and $N_2$ are the concentrations of ions in the ground and excited states, and L is the amplifier length. The total concentration of Yb ions, $N_t = N_1 + N_2$ is worked out from the measured small-signal absorption of the active fiber. For quick calculations of pulse shapes and double-pulse thresholds the population inversion, $N_2 N_1$, is relaxed according to the formula:

$$N_2 = \frac{N_i}{2 + E_p/E_{sat}} \quad (5)$$

where $E_{sat}$ is a model parameter controlling the equilibrium pulse energy. In this way, the model quickly relaxes to a steady state, regardless of the initial pulse shape. However, for modeling of Q-switching tresholds a more realistic description of gain saturation is required. In these calculations, a constant pumping power, $P_p$, at 976 nm wavelength is assumed to be fully absorbed by the active fiber, so that between passes of the mode-locked pulse $N_2$ evolves according to:

$$\frac{dN_2}{dt} = \frac{P_p}{\hbar\omega_p A_{eff} L} - N_2/\tau \quad (6)$$

whereas in each pass of the mode-locked pulse $N_2$ is reduced by:

$$\Delta N_2 = \int d\omega \frac{E_{out}(\omega) - E_{in}(\omega)}{\hbar\omega} \quad (7)$$

In these formulae, $\omega_p$ is the pump frequency, $A_{eff}$ is the amplifier effective area, $\tau$ is the Yb spontaneous-emission lifetime of 840 μs, and $E_{in}(\omega)$, $E_{out}(\omega)$ denote the spectral energy density of the pulse before and after amplifier passage respectively. This scheme offers a much more realistic description of the laser dynamics, and allows us to numerically investigate the stability of the laser against Q-switching. However, a large number (several thousand) cavity round trips are usually required to relax into a steady state, even when the simulation is started from a steady-state solution at a slightly different value of $P_p$. This difficulty motivated the development of an approximate scheme in which fiber dispersion, and the effects of Raman and self-steepening effects in the fibers are neglected. In that case, the pulse only undergoes SPM in the fibers, and the pulse evolution over a length z of fiber can be determined analytically in the time domain:

$$G(t, z) = G(t, 0)\exp(i\phi(t)z), \phi(t) = z\frac{\omega_0 n_2 |G(t, 0)|^2}{cA_{eff}} \quad (8)$$

The rationale for neglecting fiber dispersion is that the dispersion of the FBGs considered here is much stronger than the dispersion in ~3 meters of standard single-mode fiber. Since the FBGs also restrict the pulse bandwidth, it is a reasonable approximation to neglect the frequency dependence of the amplifier gain, using the $\sigma_a$ and $\sigma_e$ values at the center frequency of the grating. A frequency-independent gain can be added in the time domain, so with this approximation a full cavity round trip requires only two Fast Fourier Transform (FFT) operations, in order to go into the frequency domain and back at the FBG. Since the main computational effort in the full computation lies in the FFTs required for solving the GNLSE, this results in a significant reduction of computation time. Therefore, this approximate method has been used for testing the Q-switch stability, and it has been found to predict Q-switch treshold energies to within a few percent, and to provide an even better description of pulse profiles.

In FIG. 2(a), two typical examples of stable laser mode profiles are depicted. The profiles are calculated with the BG3 and BG7 FBG reflectors in the cavity, and have comparable pulse energies. However, in the case of the BG7 grating the laser is close to the double-pulse threshold, whereas the pulse in the BG3 laser is in the middle of the stable mode-locking regime. In FIG. 2(b), the chirp of the pulses is illustrated by plotting the instantaneous wavelength, $\lambda(t)$, which we define as:

$$\lambda(t) = \frac{2\pi c}{\omega(t)}, \omega(t) = \frac{\partial \Phi}{\partial t}, G(t, z) = |G(t, z)|\exp(i\Phi(t, z)) \quad (9)$$

It is evident from the figures that the main peak of the mode-locked pulse is formed on the long-wavelength side of the FBG center wavelength, whereas the trailing sattelites are formed on the short-wavelength side of this wavelength. This finding is readily explained by considering the various contributions to the cavity dispersion. The dispersion curves of the two gratings are depicted in FIG. 3, and it can be seen that the FBG dispersion is on the order of several ps/nm. In contrast, the total dispersion in 2.6 meters of fiber is ~0.1 ps/nm. Thus, the pulse evolution in the cavity is to a good approximation described by considering only the FBG dispersion, the SPM occurring in the fibers, and the action of the SESAM. The FBG dispersion corresponds to that of a fiber with $\beta_2=0$ but a finite and positive $\beta_3$. It is well known that a pulse coupled into such a fiber will evolve into a soliton-like pulse on the long-wavelength side of the $\beta_2=0$ point, with trailing dispersive waves on the short-wavelength side.

The central modeling results for pulse width and pulse energy regimes for stable mode locking are summarized in FIG. 4. The pulse width is plotted as a function of pulse energy for lasers with various FBG end mirrors inserted, and the curves extend over the determined range of stable single-pulse modelocking. The pulse width was in his use determined as the FVHM of the main peak, which in all cases was unambigously identified. It can be seen that the modeling results reproduce the observed experimental trends well. The pulse width decreases with increasing spectral width of the grating, in part due to a corresponding increase in pulse bandwidth, but also due to the reduced magnitude of the grating dispersion. On the other hand, the grating bandwidth has little influence on the range of pulse energies over which single-pulse is found to be stable. This range is more influenced by the grating strength, a finding we attribute to the shape of the grating reflection spectra. Gratings with weaker reflections tend to have a considerable curvature at the center reflection wavelength, whereas high-reflection gratings have a flat-top structure around the center wavelength. Now, the stabilizing effect of the FBG against Q-switching comes about due to the interplay between SPM-induced spectral broadening of the mode-locked pulse and the very strong gain-filtering effect that the FBG effectively imparts on the cavity. If the pulse energy increases infinitesimally, the increase in spectral broadening leads to a corresponding increase in the loss at the FBG mirror, which can then compensate the increase in SAM reflectivity.

It might be expected that a decrease in grating width would increase the gain filtering effect as well, however narrow gratings have higher dispersion, and the resulting increase in pulse width reduces the spectral broadening effects. On the other hand, a decrease in grating strength actually reduces dispersion, thus leading to slightly narrower pulses, a trend which may also be noted in FIG. 4. Thus, reduction in the grating strength both increases SPM effects and gain filtering, hereby pushing the range of stable single-pulse mode-locking towards lower pulse energies.

The laser system can be further simplified by discarding the output coupler and instead using the FBG itself as the output port. We have in general found this to degrade the quality of the output pulses somewhat, since in this way the edges of the pulse spectrum are preferentially outcoupled. If the FBG is not too strong and the laser is operated substantially below the double-pulse treshold, reasonably smooth pulse forms may be extracted, however the trailing dispersive waves carry a larger part of the total pulse energy than is the case when the output is taken from inside, the cavity. As the pulse energy is increased towards the double-pulse treshold, the dispersive waves become more and more pronounced. For high-reflector gratings, the pulses transmitted through the FBG are generally of a poor quality.

Finally, we mention that further pulse shortening is possible by increasing the bandwidth of the FBG. Shorter pulses facilitates the generation of bandwidth and linear chirp in subsequent amplifier stages. Using a grating with a reflection spectrum of 2300 pm FWHM, and a maximum reflectivity of 0.99 as a cavity end mirror, we obtained single pulses with a FWHM of 1.63 ps in the main peak. The larger bandwidth and weaker dispersion of the FBG thus decreases the pulse width considerably, but the generic pulse form from the more narrow gratings discussed above persists. At the same time, the regime of stable single-pulse mode locking moves to pulse energies below 10 pJ. Manufacture of such a FBG would require an index modulation of $5.10^{-3}$ which is not unfeasible, but will probably require use of a specialty fiber with high Ge content in the core.

The invention claimed is:

1. A mode locked fiber laser system arranged to have an output having a lasing bandwidth and having a linear cavity, said cavity comprising:
 a fiber gain medium,
 a saturable absorber having a saturation fluence, and
 a substantially uniform Bragg grating filter having a spectral response and a bandwidth of less than 3 nm, and
 wherein said mode locked fiber laser system is arranged so that substantial CW mode locked operation is obtainable when less than 3 times the saturation fluence is impinging on the saturable absorber, and the spectral response of the filter is arranged to dampen a spectral broadening relative to the lasing bandwidth;

said system further comprises an output coupler arranged between said substantially uniform Bragg grating filter and said saturable absorber.

2. The mode locked laser system of claim 1, wherein said broadening is at least partially a result of non-linear effects caused by an increase in optical power, such as self phase modulation in an optical fiber comprised by the cavity.

3. The mode locked laser system of claim 1, wherein said Bragg grating filter has a bandwidth of less than 1 nm.

4. The mode locked laser system of claim 1, wherein said Bragg grating filter has a main transmission dip of the spectral response having a depth of more than or equal to 3 dB.

5. The mode locked laser system of claim 1, wherein the spectral response of the Bragg grating filter comprises a substantially flat top extending more than or equal to 30% of the lasing bandwidth.

6. The mode locked laser system of claim 1, wherein the spectral response of the Bram crating filter comprises at least one slope towards lower reflectivity of more than 70% per nm.

7. The mode locked laser system of claim 1, wherein said Bragg grating filter is a fiber Bragg grating filter.

8. The mode locked laser system of claim 1, wherein said Bragg grating filter is shorter than or equal to 10 mm.

9. The mode locked laser system of claim 1, wherein said laser system comprises an optical fibre with low non-linearity.

10. The mode locked laser system of claim 1, wherein said cavity is substantially polarization maintaining.

11. The mode locked laser system of claim 1, having a pulsed output wherein said pulse has a (FWHM) time span of approximately more than 1 ps.

12. The mode locked laser system of claim 1, having an output path, said output path comprising an optical output filter.

13. The mode locked laser system of claim 12, having an output pulse shape having a main peak and an output spectral distribution wherein said optical output filter is arranged to reduce distortion of the output spectral distribution relative to an ideal output spectral distribution.

14. The mode locked laser system of claim 12, wherein said optical output Bragg grating filter is arranged to reduce spikes in the output spectral distribution, caused by said spectral response of the filter.

15. The mode locked laser system of claim 1, wherein said saturable absorber has a saturable absorption of at least 5%.

16. The mode locked laser system of claim 1, wherein said saturable absorber has a saturable absorption of at least 10%.

17. A mode locked fiber laser system arranged to have an output having a lasing bandwidth and a pulse peak power, said system having a linear cavity with a non-linear property, said cavity comprising:
 a fiber gain medium,
 a saturable absorber, and
 a substantially uniform Bragg grating filter having a spectral response and a bandwidth of less than 3 nm,
 wherein the spectral response of said filter is arranged to reduce spectral components outside said lasing bandwidth arising from self-phase modulation caused by said non-linear property and an increase in pulse peak power;

said system further comprises an output coupler arranged between said substantially uniform Bragg grating filter and said saturable absorber.

18. A mode locked fiber laser system arranged to have an output having a lasing bandwidth and a pulse power in CW mode-locked operation, said laser having a linear cavity, said cavity comprising:
 a fiber gain medium,
 a saturable absorber having a saturation fluence, and
 a substantially uniform Bragg filter having a spectral response and a bandwidth,
 wherein said filter is arranged to exhibit an increased loss outside the lasing bandwidth of less than 3 nm so that a spectral broadening relative to said lasing bandwidth due to an increase in optical pulse power is sufficiently penalized to stabilize the laser in CW mode-locking operation;

said system further comprises an output coupler arranged between said substantially uniform Bragg grating filter and said saturable absorber.

19. The mode locked laser system of claim 18, wherein said loss is arranged so that if pulse energy increases, the increase in spectral broadening leads to a corresponding loss at the Bragg grating filter which then compensate the increase in reflectivity of the saturable absorber.

20. The mode locked laser system of claim 18 wherein said Bram grating filter is arranged such that substantial CW mode locked operation is obtainable with less than 3 times the saturation fluence impinging on the saturable absorber.

21. The mode locked laser system of claim 18 wherein said Bragg grating filter have a bandwidth of less than 1 nm.

22. The mode locked laser system of claim 18 wherein said Bragg grating filter has a main transmission dip of the spectral response having a depth of more than or equal to 3 dB.

23. The mode locked laser system of claim 18 wherein said Bragg grating filter is a fiber Bragg grating filter.

24. The mode locked laser system of claim 18 wherein said Bragg grating filter is shorter than or equal to 10 mm.

25. The mode locked laser system of claim 18 wherein said laser system comprises an optical fiber with low non-linearity.

26. The mode locked laser system of claim 18 wherein said cavity is substantially polarization maintaining.

27. The mode locked laser system of claim 18 having a pulsed output wherein said pulse has a (FWHM) time span of more than 1 ps.

28. The mode locked laser system of claim 18 further having an output path, said output path comprising an optical output filter.

29. The mode locked laser system of claim 18 wherein the saturable absorber is a semiconductor saturable absorber.

30. The mode locked laser system of claim 18 wherein the saturable absorber is a semiconductor absorbable mirror.

31. The mode locked laser system of claim 18, wherein said saturable absorber has a saturable absorption of at least 5%.

32. The mode locked laser system of claim 18, wherein said saturable absorber has a saturable absorption of at least 10%.

* * * * *